(12) United States Patent
Huang

(10) Patent No.: US 9,953,664 B1
(45) Date of Patent: Apr. 24, 2018

(54) AUTOMATIC RECORD PLAYER

(71) Applicant: YA HORNG ELECTRONIC CO., LTD., Tainan (TW)

(72) Inventor: Jin-Yi Huang, Tainan (TW)

(73) Assignee: YA HORNG ELECTRONIC CO., LTD., Tainan (TW)

( * ) Notice: Subject to any disclaimer, the term of this patent is extended or adjusted under 35 U.S.C. 154(b) by 0 days.

(21) Appl. No.: 15/658,191

(22) Filed: Jul. 24, 2017

(30) Foreign Application Priority Data

Mar. 14, 2017 (TW) .............................. 106203560 U

(51) Int. Cl.
*G11B 3/60* (2006.01)
(52) U.S. Cl.
CPC ...................................... *G11B 3/60* (2013.01)
(58) Field of Classification Search
None
See application file for complete search history.

(56) References Cited

U.S. PATENT DOCUMENTS

| | | | | |
|---|---|---|---|---|
| 2,989,312 A | * | 6/1961 | Vistain, Jr. ........... | G11B 17/165 369/189 |
| 4,098,512 A | * | 7/1978 | Takizawa ............... | G11B 3/095 369/216 |
| 4,344,163 A | * | 8/1982 | Madalinski ........... | G11B 3/121 369/245 |
| 4,734,902 A | * | 3/1988 | Dennis .................. | G11B 3/085 369/176 |
| 9,454,977 B1 | * | 9/2016 | Huang .................... | G11B 3/34 |

FOREIGN PATENT DOCUMENTS

| | | | | | |
|---|---|---|---|---|---|
| DE | 1963903 A1 | * | 7/1970 | ......... | G11B 3/08545 |
| GB | 1197839 A | * | 7/1970 | ............. | G11B 17/12 |
| GB | 1336033 A | * | 11/1973 | ......... | G11B 3/08545 |
| GB | 1412302 A | * | 11/1975 | ............. | G11B 17/00 |
| GB | 1422670 A | * | 1/1976 | ............... | G11B 3/06 |

* cited by examiner

*Primary Examiner* — William J Klimowicz
(74) *Attorney, Agent, or Firm* — Christensen O'Connor Johnson Kindness PLLC

(57) ABSTRACT

A novel automatic record player for playing a phonograph record includes a base, a turntable, an upper hub, a lower hub, a tonearm, a drive unit, a pinion, a control cam, a main arm, an auxiliary arm, first and second micro-switches, a clutch member, a first clutch actuating member, a switch activating member, an actuating pin, a synchronizing unit, a position guide, an angular position setting unit, and an elongated member. With the provision of the angular position setting unit, when the clutch member is actuated by the first clutch actuating member, a forward free end of the tonearm can be more precisely positioned on an outermost groove of the phonograph record.

11 Claims, 20 Drawing Sheets

AUTOMATIC RECORD PLAYER

CROSS-REFERENCE TO RELATED APPLICATION

This application claims priority from Taiwanese patent application no. 106203560, filed on Mar. 14, 2017.

FIELD

The disclosure relates to a record player, more particularly to an automatic record player for playing a phonograph record.

BACKGROUND

The inventor of this application has proposed an automatic record player for playing a phonograph record, which is disclosed in U.S. Pat. No. 9,454,977B1, and which includes a base, a turntable, upper and lower hubs, a tonearm, a drive unit, a pinion, a control cam, a main arm, an auxiliary arm, first and second micro-switches, a clutch member, a first clutch actuating member, a switch activating member, an actuating pin, a synchronizing unit, a position guide, and an elongated member. When the clutch member is actuated by the first clutch actuating member, a forward free end of the tonearm is automatically positioned on the phonograph record. When the clutch member is actuated by the second clutch actuating member or the elongated member, the forward free end of the tonearm is automatically disposed outwardly of the phonograph record.

SUMMARY

In order to more precisely position a forward free end of a tonearm on a phonograph record, the inventor proposes a novel automatic record player.

According to the disclosure, an automatic record player for playing a phonograph record includes a base, a turntable, an upper hub, a lower hub, a tonearm, a drive unit, a pinion, a control cam, a main arm, an auxiliary arm, first and second micro-switches, a clutch member, a first clutch actuating member, a switch activating member, an actuating pin, a synchronizing unit, a position guide, an angular position setting unit, and an elongated member. The base has an upper surface and a lower surface which are opposite to each other in an upright direction. The turntable is rotatably mounted on the upper surface of the base about a turntable axis for supporting the phonograph record. The upper and lower hubs are coaxially and rotatably mounted on the upper and lower surfaces of the base, respectively, and are configured to be co-rotatable about a swivel axis parallel to the turntable axis. The upper hub is disposed outwardly of the turntable. The tonearm has a forward free end and a rearward end which is coupled to and rotatable with the upper hub about the swivel axis so as to permit the forward free end to be angularly displaceable among an outermost position, where the forward free end is disposed beyond a marginal edge of the phonograph record, a starting position, where the forward free end is in vertical register with an outermost groove of the phonograph record, and an innermost position, where the forward free end is in vertical register with an innermost groove of the phonograph record. The drive unit has an output shaft configured to drive the turntable to rotate about the turntable axis. The pinion has gear teeth and is disposed on a lower surface of the turntable to be rotated with the turntable about the turntable axis. The control cam has a wheel body defining a wheel axis, and a plurality of driven teeth which are disposed on a rim of the wheel body to surround the wheel axis, and which are configured to mesh with the gear teeth of the pinion so as to permit the wheel body to be driven by the pinion. The control cam further has a cutout portion configured to interrupt the driven teeth. The wheel body has an upper major surface and a lower major surface. The lower major surface has a cycle route which has an origin point and a midway point. The main arm includes an arm body having a proximate end and a distal end, and a cam follower pin which is secured to the proximate end, and which is configured to be guided by and moved along the cycle route such that when the cam follower pin is moved from the origin point to the midway point, the distal end is moved from a close position through a transit zone to a remote position, and such that when the cam follower pin is moved from the midway point back to the origin point, the distal end is moved from the remote position through the transit zone to the close position. The auxiliary arm is pivotally mounted on the main arm about a pivot axis, and has a first end segment and a second end segment. The first end segment has a first cam follower region which is distal from the proximate end. The second end segment is opposite to the first end segment relative to the pivot axis, and has a pushing region configured to be movable between a normal orientation and a change orientation such that the pushing region, when placed in the change orientation, is permitted to move to the normal orientation in response to movement of the distal end from the remote position through the transit zone. The first and second micro-switches are disposed distal from and proximate to the wheel body, respectively, and are electrically connected to the drive unit such that when at least one of the first and second micro-switches is in a switch-on state, the turntable is driven by the output shaft to rotate about the turntable axis. The clutch member is pivotally mounted on the upper major surface of the wheel body, and has a clutch end which is angularly displaceable between an idle position, where the clutch end is disposed away from the cutout portion, and an active position, where the clutch end extends into the cutout portion to permit the clutch end to be engaged with the pinion so as to initiate rotation of the wheel body through meshing engagement between the driven teeth of the control cam and the gear teeth of the pinion. The first clutch actuating member is disposed in proximity of the wheel body to displace the clutch end to the active position, and is configured to be displaceable between a first actuating position, where the clutch end is in the active position, and a first non-actuating position, where the clutch end is in the idle position. The first clutch actuating member is biased to the first non-actuating position. The switch activating member has a switch activating region and a cam region, and is displaceable between a switch-off position and a switch-on position. The switch activating region is configured such that when the switch activating member is in the switch-off position, the first micro-switch is kept in a switch-off state by the switch activating region, and such that when the switch activating member is displaced to the switch-on position, the first micro-switch is set free from the switch activating region and returns to the switch-on state. The cam region is configured such that when the switch activating member is displaced from the switch-off position to the switch-on position to thereby permit the distal end to be moved from the close position to the remote position, the first cam follower region is brought into cam engagement with the cam region to thereby move the pushing region to the change orientation. The actuating pin is disposed on the first end segment and is configured to force the switch activating member back to the switch-off position once the pushing region is moved to the change orientation. The synchronizing unit is configured to couple the switch activating member to the first clutch actuating member such that when the switch activating member is displaced to the switch-on position, the first clutch actuating member is simultaneously displaced to the first actuating position. The position guide is disposed to be rotatable with the lower hub so as to permit the tonearm to rotate with the position guide about the swivel axis. The angular position setting unit includes a lever member which is mounted pivotally on the base about a fulcrum axis parallel to and offset from the pivot axis, and which has a first lever segment, a second lever segment, a force pick-up pin, and a force deliver protuberance. The first and second lever segments are opposite to each other relative to the fulcrum axis. The force pick-up pin is disposed on the first lever segment, and is configured such that when the pushing region is in the change orientation, the force pick-up pin is kept in engagement with and actuated by the pushing region to angularly move about the fulcrum axis so as to advance a predetermined angular distance. The force deliver protuberance is disposed on the second lever segment, and is actuated to make a counterclockwise angular movement and is coupled to rotate the position guide about the swivel axis based on the predetermined angular distance so as to permit the forward free end of the tonearm to be displaced from the outermost position to the starting position when the distal end is displaced from the remote position toward the close position. The elongated member is coupled to the position guide, and has an activating region which is configured such that the second micro-switch is kept in a switch-off state by the activating region when the distal end is in the close position and when the forward free end of the tonearm is in the outermost position, and such that when the distal end is displaced from the close position or when the forward free end of the tonearm is displaced from the outermost position, the second micro-switch is set free from the activating region and returns to the switch-on state.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
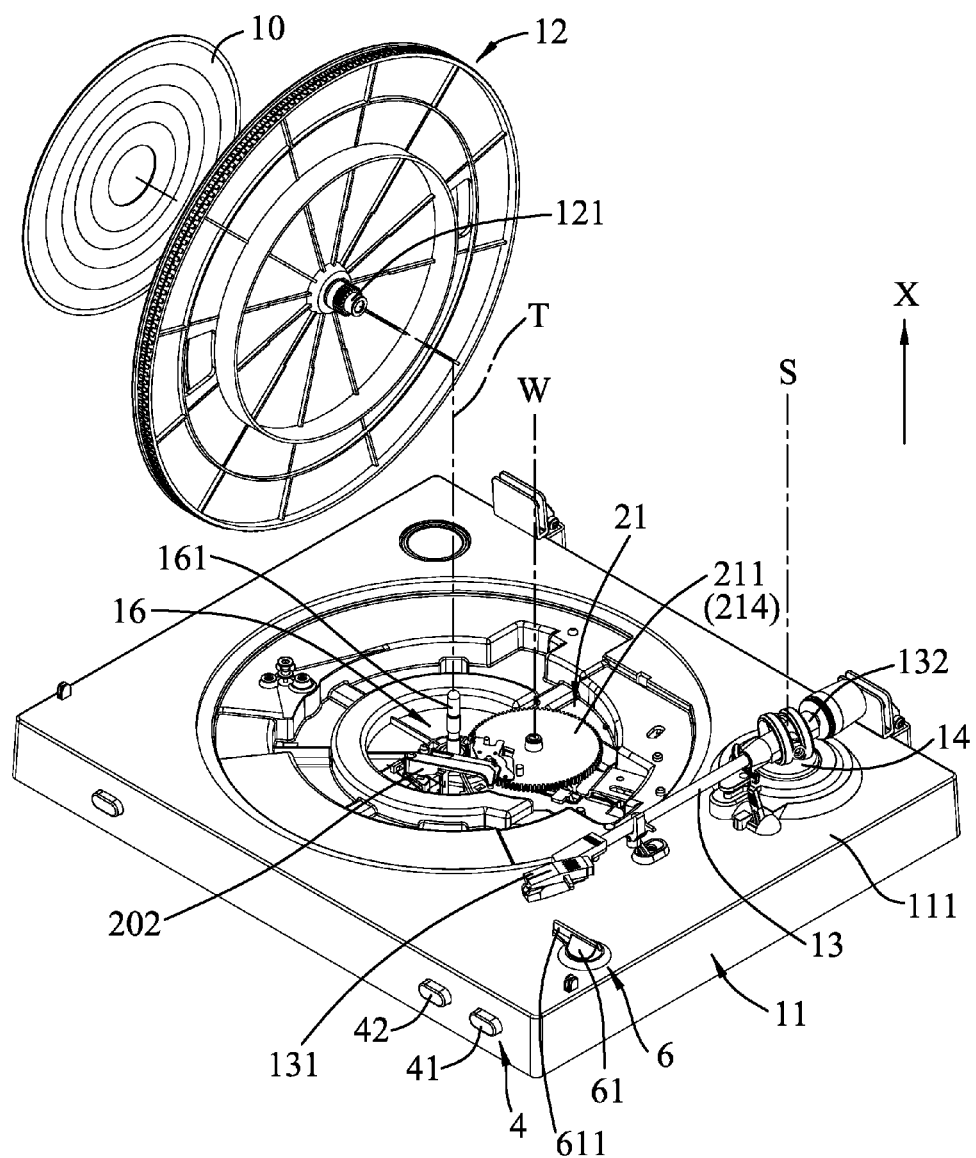
FIG. 1 is a partial exploded perspective view of an automatic record player according to a first embodiment of the disclosure.

Before the disclosure is described in greater detail, it should be noted that where considered appropriate, reference numerals have been repeated among the figures to indicate corresponding or analogous elements, which may optionally have similar characteristics.

Figure 5:
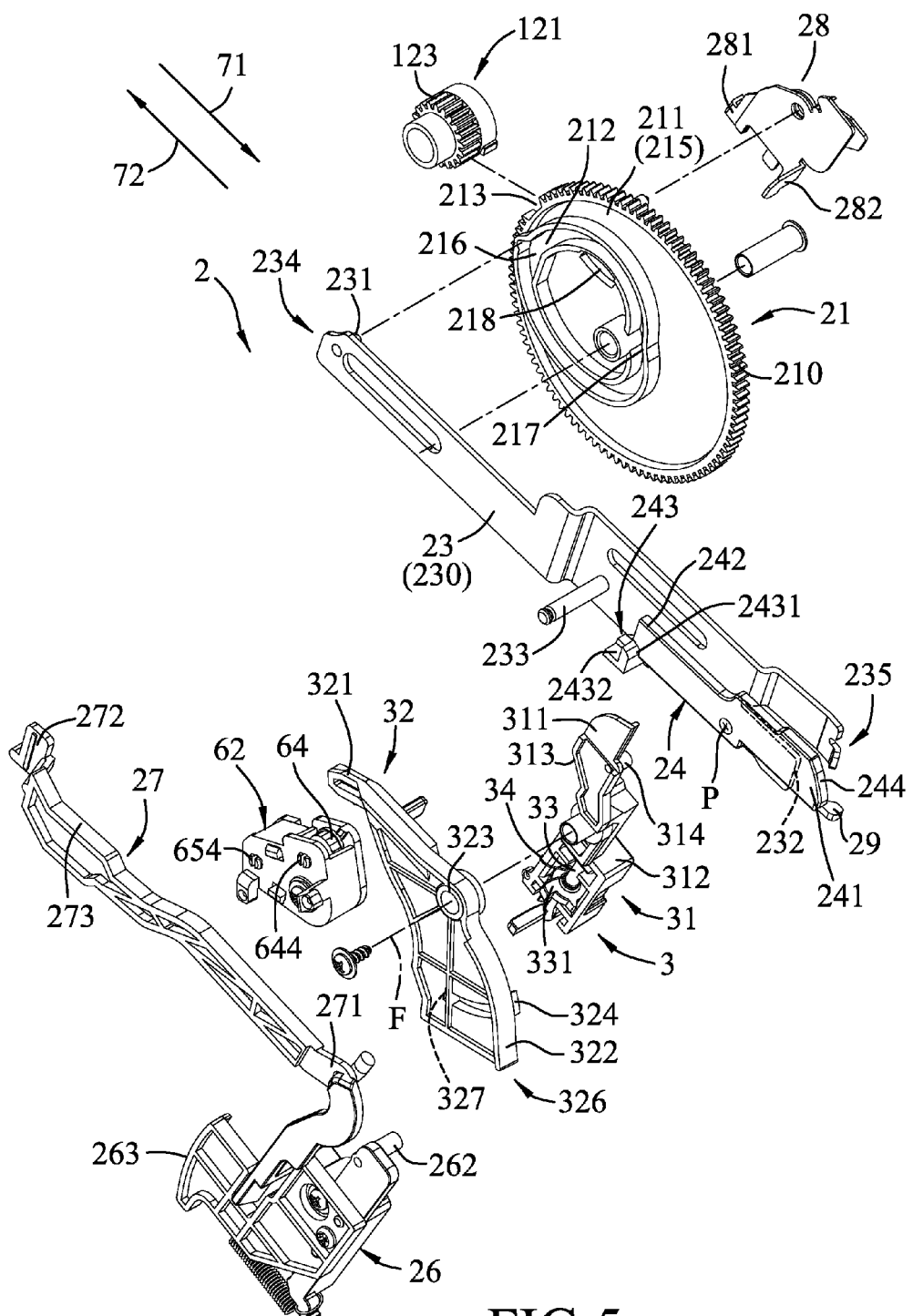
FIG. 5 is a partial exploded perspective view illustrating some elements of the automatic record player.
Figure 6:
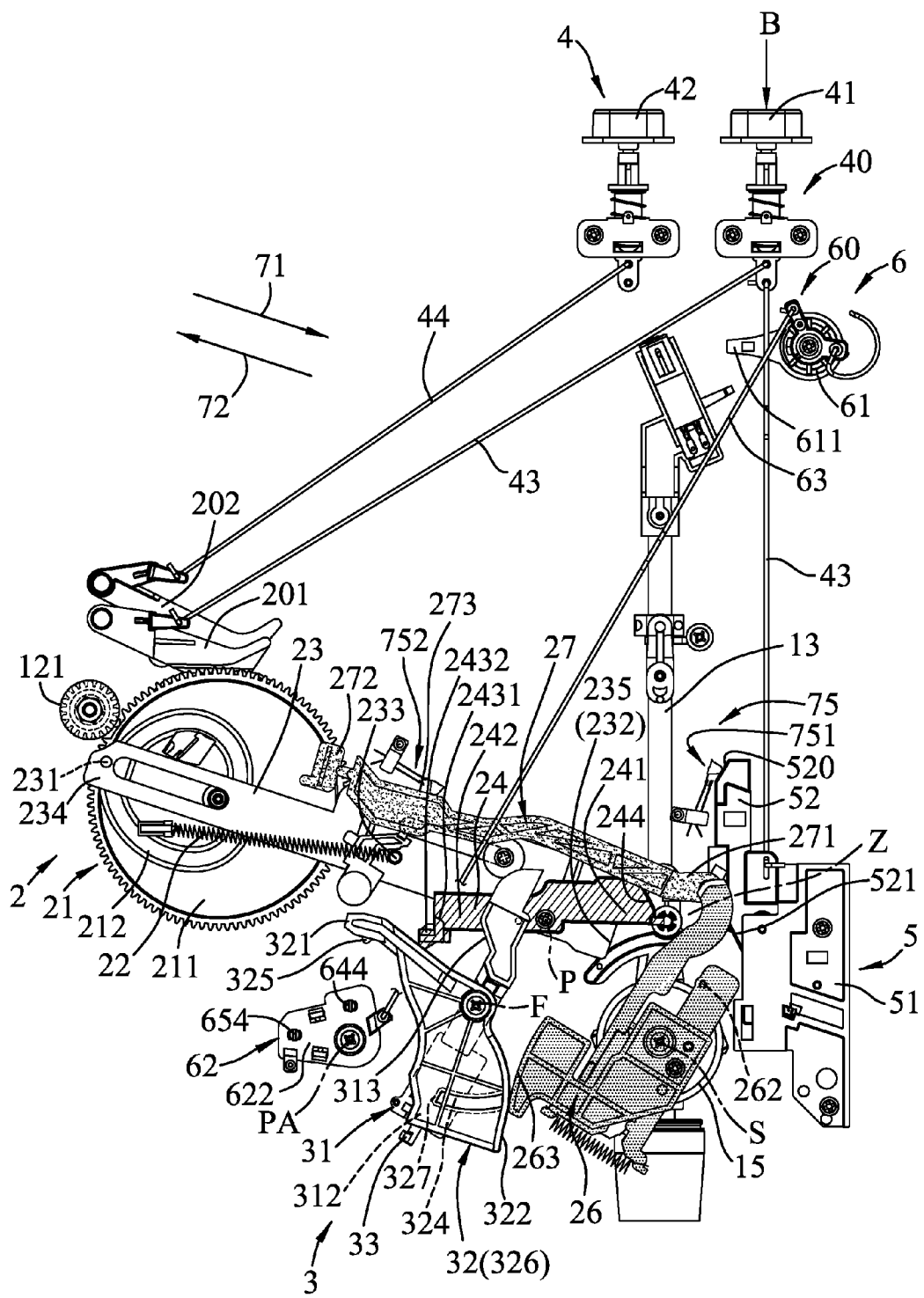
FIG. 6 is a fragmentary bottom view of the automatic record player.

Referring to FIGS. 1, 5 and 6, an automatic record player for playing a phonograph record 10 according to a first embodiment of the disclosure is shown to include a base 11, a turntable 12, an upper hub 14, a lower hub 15, a tonearm 13, a drive unit 16, a pinion 121, a transmission assembly 2, a play control unit 4, a guiding unit 5, and a switch unit 75.

The transmission assembly 2 includes a control cam 21, a main arm 23, an auxiliary arm 24, a clutch member 28, an actuating pin 29, a position guide 26, an angular position setting unit 3, and an elongated member 27. The play control unit 4 includes a first clutch actuating member 201, and a synchronizing unit 40. The guiding unit 5 includes a switch activating member 52. The switch unit includes a first micro-switch 751 and a second micro-switch 752.

Figure 2:
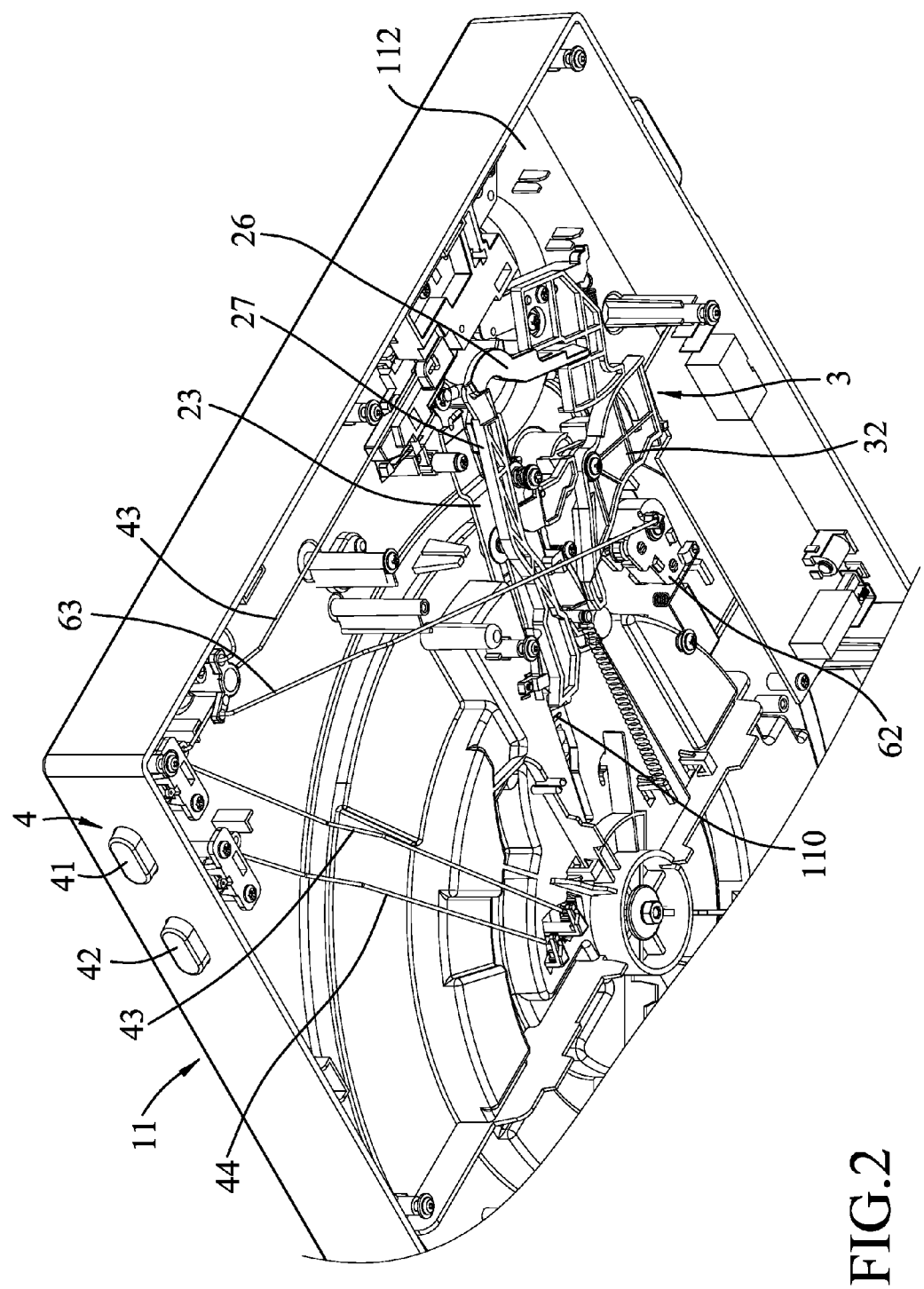
FIG. 2 is a fragmentary enlarged perspective view illustrating a bottom side of the automatic record player.

As shown in FIGS. 1 and 2, the base 11 has an upper surface 111 and a lower surface 112 which are opposite to each other in an upright direction (X). In this embodiment, the base 11 has a sliding slot 110 extending from the upper surface 111 to the lower surface 112.

The turntable 12 is rotatably mounted on the upper surface 111 of the base 11 about a turntable axis (T) for supporting the phonograph record 10. In this embodiment, the turntable axis (T) extends in the upright direction (X).

Figure 14:
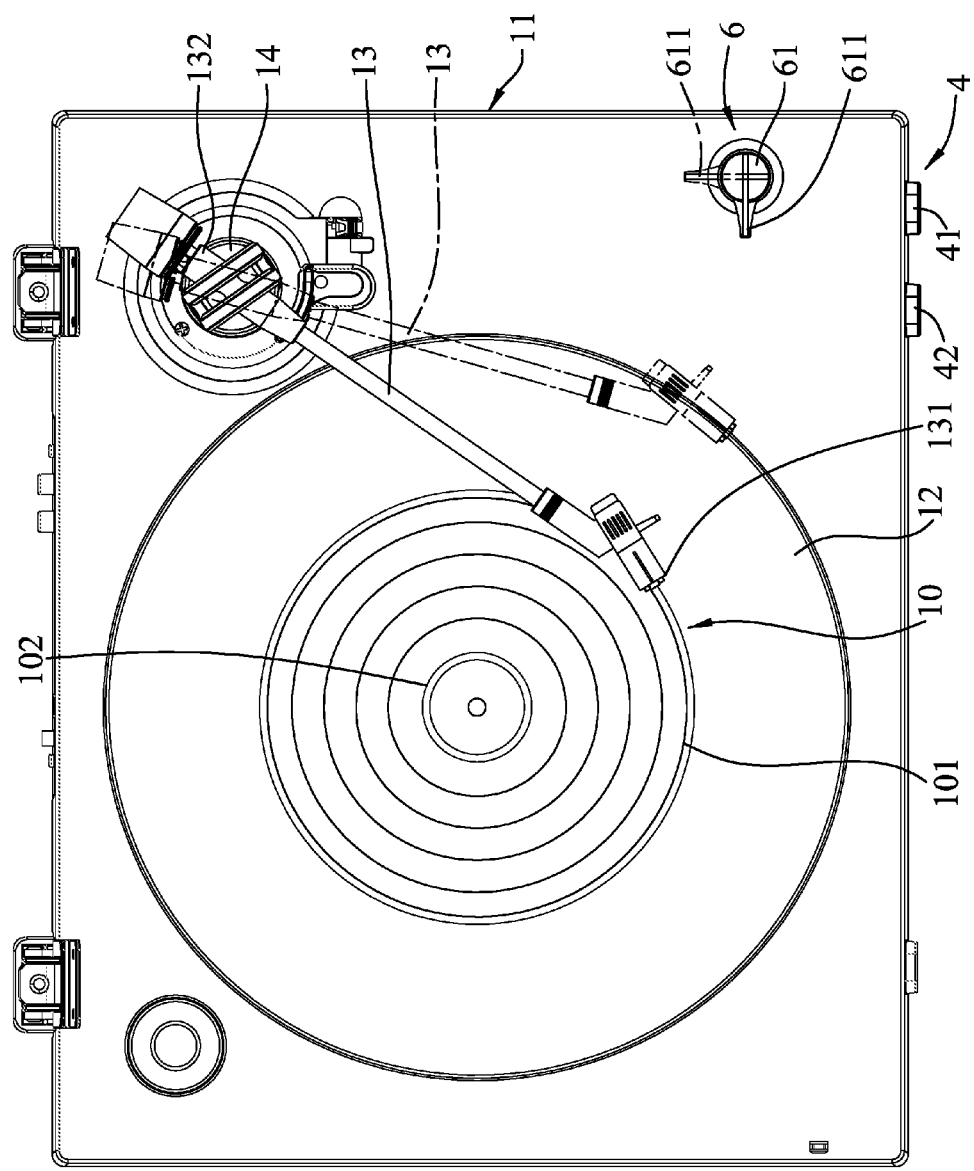
FIG. 14 is atop view of the automatic record player.

With reference to FIGS. 1, 2, and 5, it can be observed that the upper and lower hubs 14, 15 are coaxially and rotatably mounted on the upper and lower surfaces 111, 112 of the base 11, respectively, and are configured to be co-rotatable about a swivel axis (S) parallel to the turntable axis (T). As shown in FIG. 14, the upper hub 14 is disposed outwardly of the turntable 12.

As shown in FIGS. 1 and 14, the tonearm 13 has a forward free end 131 and a rearward end 132. The rearward end 132 is coupled to and rotatable with the upper hub 14 about the swivel axis (S) so as to permit the forward free end 131 to be angularly displaceable among an outermost position, a starting position, and an innermost position. In the outermost position, the forward free end 131 is disposed beyond a marginal edge of the phonograph record 10 (see FIGS. 1 and 6). In the starting position, the forward free end 131 is in vertical register with an outermost groove 101 of the phonograph record 10 (see FIGS. 11, 14, and 15). In the innermost position, the forward free end 131 is in vertical register with an innermost groove 102 of the phonograph record 10.

The drive unit 16 has an output shaft 161 configured to drive the turntable 12 to rotate about the turntable axis (T).

Referring to FIGS. 1 and 3 to 5, it is shown that the pinion 121 has gear teeth 123 and is disposed on a lower surface of the turntable 12 to be rotated with the turntable 12 about the turntable axis (T).

The control cam 21 has a wheel body 211, a plurality of driven teeth 210. The wheel body 211 defines a wheel axis (W), and has an upper major surface 214 and a lower major surface 215. The lower major surface 215 has a cycle route 212 which has an origin point 216 and a midway point 217. The driven teeth 210 are disposed on a rim of the wheel body 211 to surround the wheel axis (W), and are configured to mesh with the gear teeth 123 of the pinion 121 so as to permit the wheel body 211 to be driven by the pinion 121. The control cam 21 further has a cutout portion 213 configured to interrupt the driven teeth 210. In this embodiment, the wheel body 211 has a through bore 218.

As shown in FIGS. 5 and 6, the main arm 23 includes an arm body 230 and a cam follower pin 231. The arm body 230 has a proximate end 234 and a distal end 235. The cam follower pin 231 is secured to the proximate end 234, and is configured to be guided by and moved along the cycle route 212 such that when the cam follower pin 231 is moved from the origin point 216 to the midway point 217, the distal end 235 is moved from a close position (FIG. 6) through a transit zone (Z) to a remote position (FIG. 10) along an arrow direction 71, and such that when the cam follower pin 231 is moved from the midway point 217 back to the origin point 216, the distal end 235 is moved from the remote position (FIG. 10) through the transit zone (Z) to the close position (FIG. 13) along an arrow direction 72.

In this embodiment, the displacement of the main arm 23 is guided by the sliding slot 110, and the distal end 235 has a pushing surface 232. In addition, the main arm 23 further has a post 233 which is disposed on the arm body 230 between the proximate and distal ends 234, 235, and which is coupled to the wheel body 211 by a spring 22 that provides a biasing force to bias the distal end 235 toward the close position.

As shown in FIG. 5, the auxiliary arm 24 is pivotally mounted on the main arm 23 about a pivot axis (P), and has a first end segment 241 and a second end segment 242. The first end segment 241 has a first cam follower region 244 distal from the proximate end 234. The second end segment 242 is opposite to the first end segment 241 relative to the pivot axis (P), and has a pushing region 2432 configured to be movable between a normal orientation (FIGS. 6, 9, and 13) and a change orientation (FIGS. 10 and 11) such that the pushing region 2432, when placed in the change orientation, is permitted to move to the normal orientation in response to movement of the distal end 235 from the remote position (FIG. 10) through the transit zone (Z).

Referring back to FIG. 5, it is shown in this embodiment that the second end segment 242 of the auxiliary arm 24 is formed with a projection 243 having a first surface 2431 and a second surface 2432 which is opposite to the first surface 2431 and which serves as the pushing region 2432.

As shown in FIG. 6, the first and second micro-switches 751, 752 are disposed distal from and proximate to the wheel body 211, respectively. In addition, the first and second micro-switches 751, 752 are electrically connected to the drive unit 16 such that when at least one of the first and second micro-switches 751, 752 is in a switch-on state, the turntable 12 is driven by the output shaft 161 to rotate about the turntable axis (T).

Figure 3:
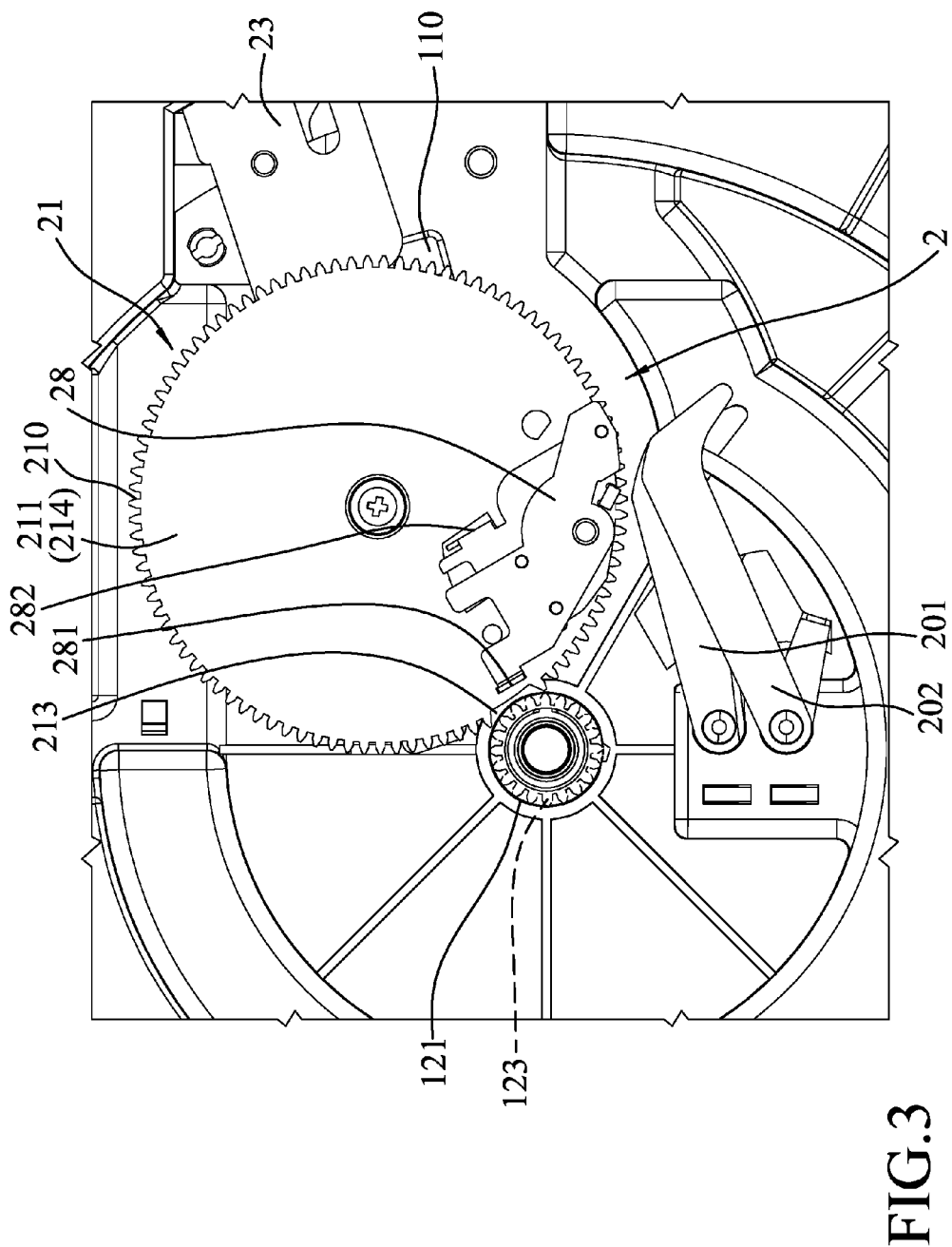
FIG. 3 is a fragmentary enlarged top view of the automatic record player.
Figure 4:
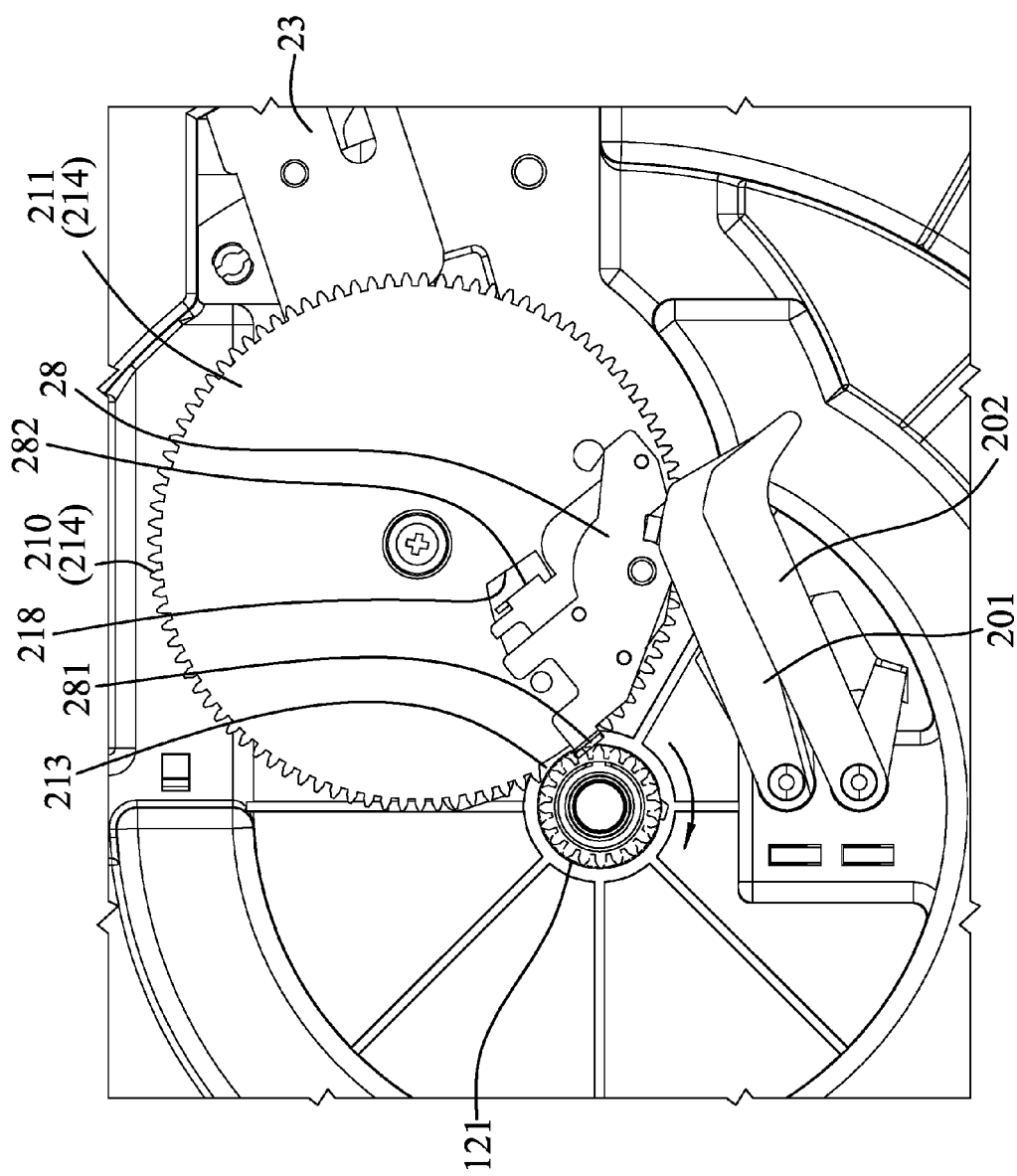
FIG. 4 is similar to FIG. 3, but showing a clutch end of a clutch member in an active position.

As shown in FIGS. 3 to 5, the clutch member 28 is pivotally mounted on the upper major surface 214 of the wheel body 211, and has a clutch end 281 which is angularly displaceable between an idle position (FIG. 3), where the clutch end 281 is disposed away from the cutout portion 213, and an active position (FIG. 4), where the clutch end 281 extends into the cutout portion 213 to permit the clutch end 281 to be engaged with the pinion 121 so as to initiate rotation of the wheel body 211 through meshing engagement between the driven teeth 210 of the control cam 21 and the gear teeth 123 of the pinion 121.

In this embodiment, the clutch member 28 has a bent tab 282 which extends through the through bore 218 of the wheel body 211 and downwardly of the lower major surface 215 of the wheel body 211.

The first clutch actuating member 201 is disposed in proximity of the wheel body 211 to displace the clutch end 281 to the active position, and is configured to be displaceable between a first actuating position (FIG. 4), where the clutch end 281 is in the active position, and a first non-actuating position (FIG. 3), where the clutch end 281 is in the idle position. The first actuating member 201 is biased to the first non-actuating position.

Figure 9:
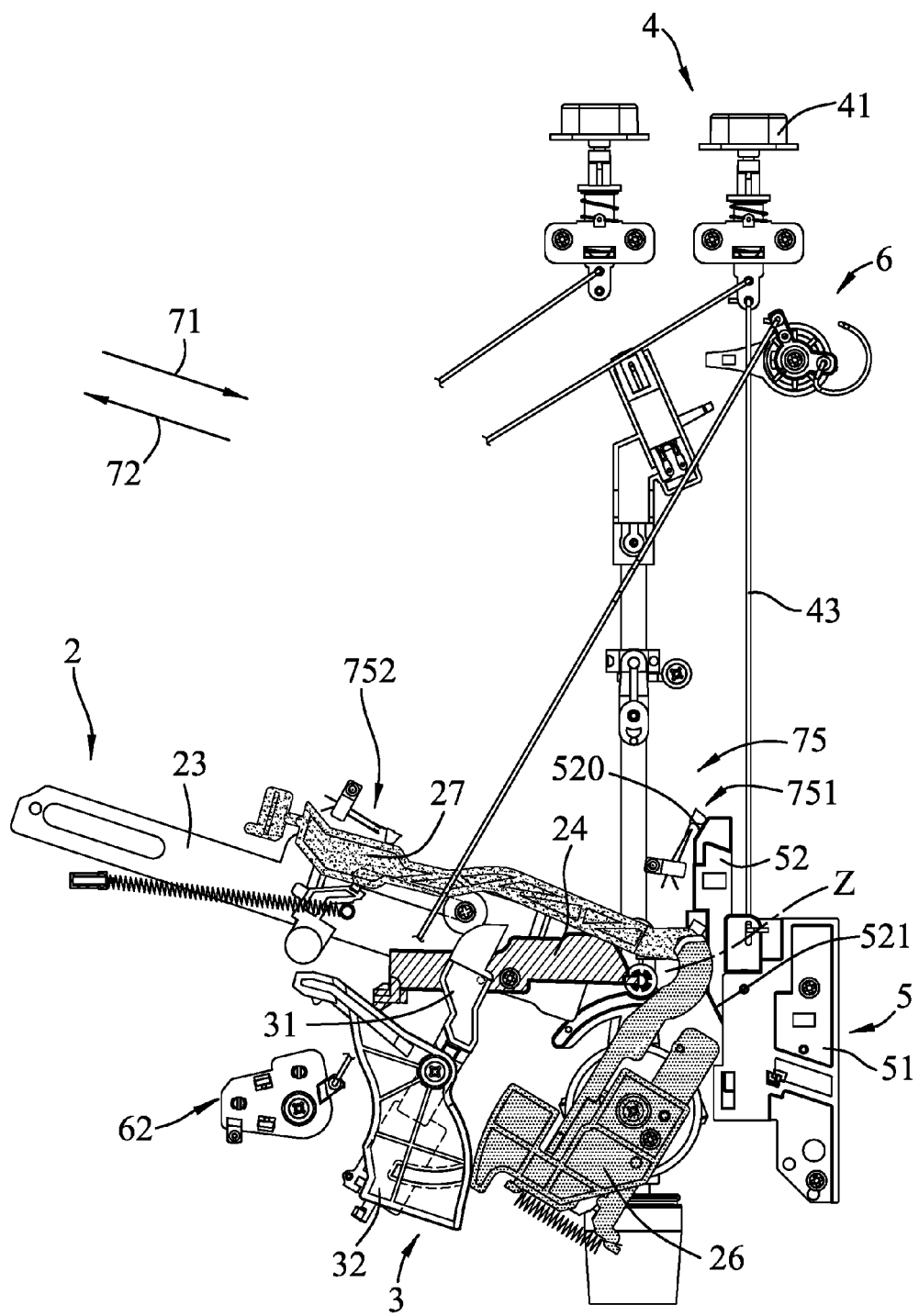
FIG. 9 is similar to FIG. 6 but illustrating a switch activating member of the automatic record player in a switch-on position.

As shown in FIG. 6, the switch activating member 52 has a switch activating region 520 and a cam region 521, and is displaceable between a switch-off position (FIGS. 6 and 10) and a switch-on position (FIG. 9). The switch activating region 520 is configured such that when the switch activating member 52 is in the switch-off position (FIGS. 6 and 10), the first micro-switch 751 is kept in a switch-off state by the switch activating region 520, and such that when the switch activating member 52 is displaced to the switch-on position (FIG. 9), the first micro-switch 751 is set free from the switch activating region 520 and returns to the switch-on state. The cam region 521 is configured such that when the switch activating member 52 is displaced from the switch-off position to the switch-on position to thereby permit the distal end 235 to be moved from the close position (FIG. 6) to the remote position (FIG. 10), the first cam follower region 244 is brought into cam engagement with the cam region 521 to thereby move the pushing region 2432 to the change orientation (FIG. 10).

Figure 10:
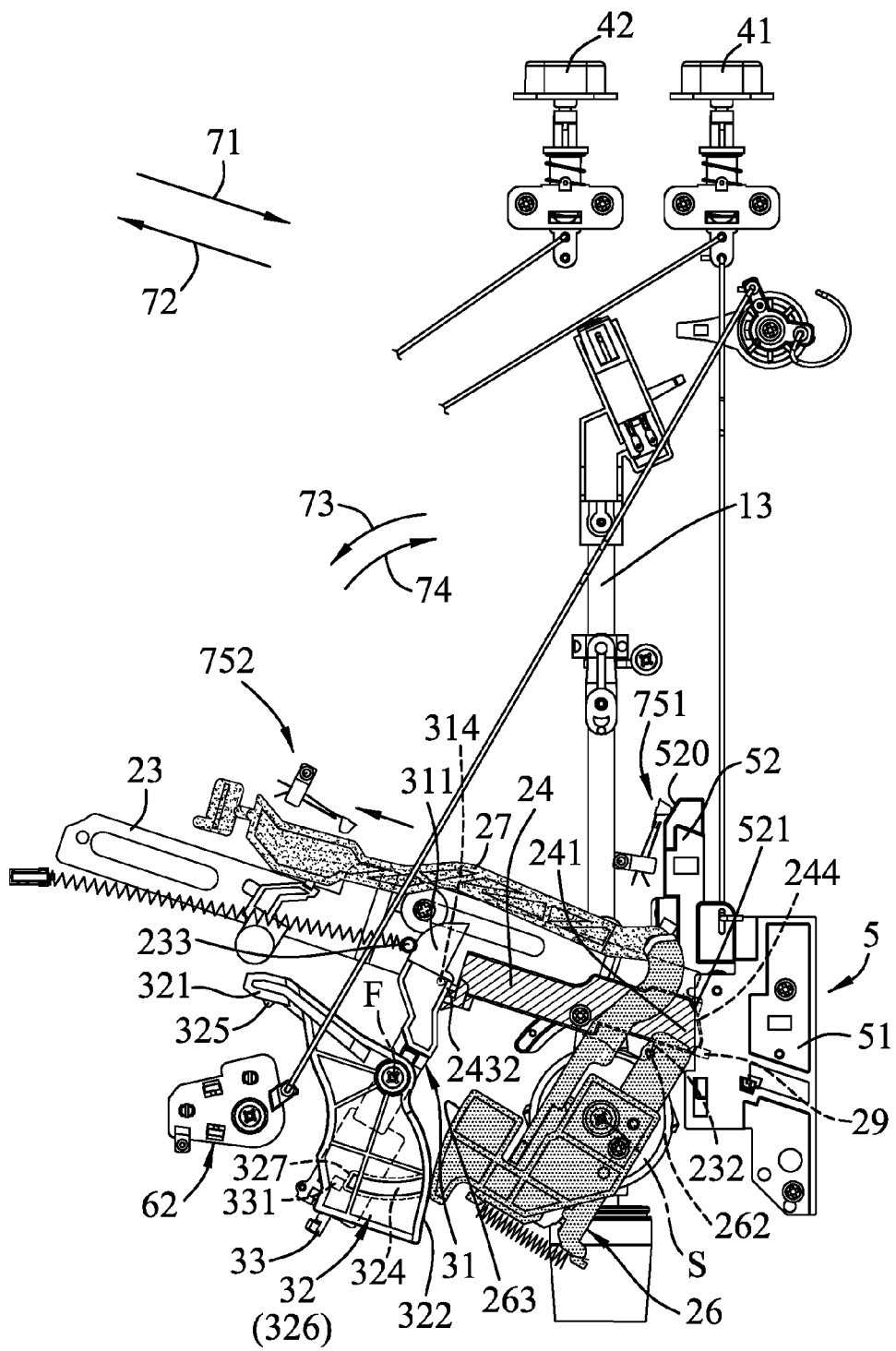
FIG. 10 is similar to FIG. 9 but illustrating a pushing region of an auxiliary arm of the automatic record player in a change orientation.

The actuating pin 29 is disposed on the first end segment 241, and is configured to force the switch activating member 52 back to the switch-off position once the pushing region 2432 is moved to the change orientation (see FIG. 10).

In this embodiment, the guiding unit 5 includes a mounting seat 51 mounted on the lower surface 112 of the base 11. Once the switch activating member 52 is displaced to the switch-on position (FIG. 9), the switch activating member 52 is locked to the mounting seat 51. Once the pushing region 2432 is displaced to the change orientation (FIG. 10), the lock between the mounting seat 51 and the switch activating member 52 is unlocked by the actuating pin 29.

The synchronizing unit 40 is configured to couple the switch activating member 52 to the first clutch actuating member 201 such that when the switch activating member 52 is displaced to the switch-on position (FIG. 9), the first clutch actuating member 201 is simultaneously displaced to the first actuating position (FIG. 4).

In this embodiment, as shown in FIG. 6, the synchronizing unit 40 includes a start push button 41 and a pair of non-stretchable cords 43. When a manual force is exerted on the start push button 41 along an arrow direction (B), the switch activating member 52 is displaced to the switch-on position (FIG. 9) and the first clutch actuating member 201 is simultaneously displaced to the first actuating position (FIG. 4). As soon as the first clutch actuating member 201 is moved to the first actuating position to thereby move the clutch end 281 to the active position, the first clutch actuating member 201 returns to the first non-actuating position automatically.

The position guide 26 is disposed to be rotatable with the lower hub 15 so as to permit the tonearm 13 to rotate with the position guide 26 about the swivel axis (S). In this embodiment, as shown in FIG. 6, the position guide 26 has a protrusion 262 and a couple surface 263.

With reference to FIGS. 5 and 6, it can be noted that the angular position setting unit 3 includes a lever member 31 which is mounted pivotally on the base 1 about a fulcrum axis (F) parallel to and offset from the pivot axis (P), and which has a first lever segment 311, a second lever segment 312, a force pick-up pin 314, and a force deliver protuberance 331.

The first and second lever segments 311, 312 are opposite to each other relative to the fulcrum axis (F). In this embodiment, the first lever segment 311 has a pushed surface 313, and the second lever segment 312 is formed with a cavity 315 (see FIG. 7).

The force pick-up pin 314 is disposed on the first lever segment 311, and is configured such that when the pushing region 2432 is in the change orientation (FIGS. 10 and 11), the force pick-up pin 314 is kept in engagement with and actuated by the pushing region 2432 to angularly move about the fulcrum axis (F) so as to advance a predetermined angular distance.

Figure 13:
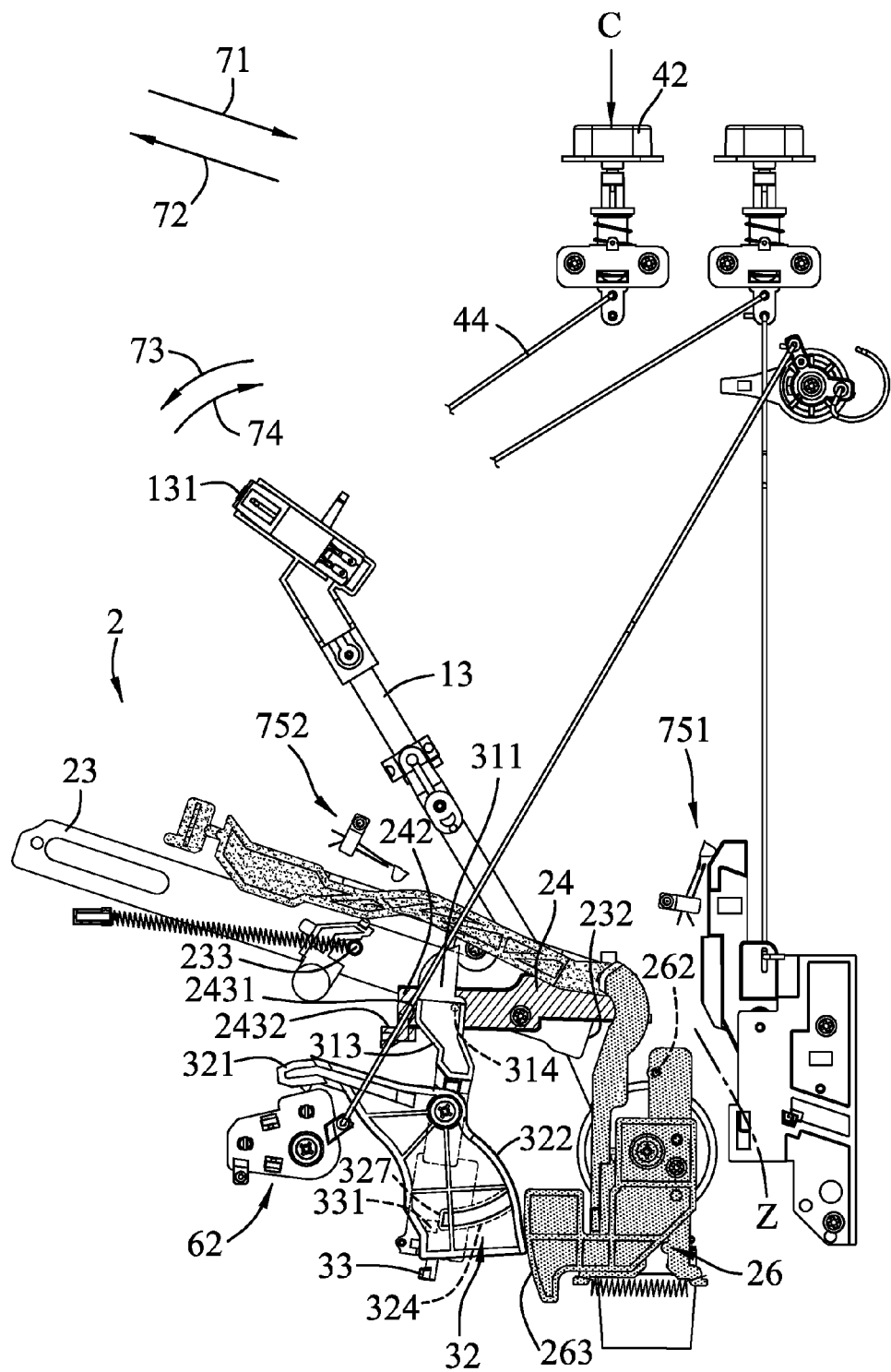
FIG. 13 is similar to FIG. 11 but illustrating the forward free end of the tonearm to be disposed between a starting position and an innermost position.

The force deliver protuberance 331 is disposed on the second lever segment 312, and is actuated to make a counterclockwise angular movement along an arrow direction 73 and is coupled to rotate the position guide 26 about the swivel axis (S) based on the predetermined angular distance so as to permit the forward free end 131 of the tonearm 13 to be displaced from the outermost position (FIG. 10) to the starting position (FIG. 11) when the distal end 235 is displaced from the remote position (FIG. 10) toward the close position (FIG. 13).

Figure 7:
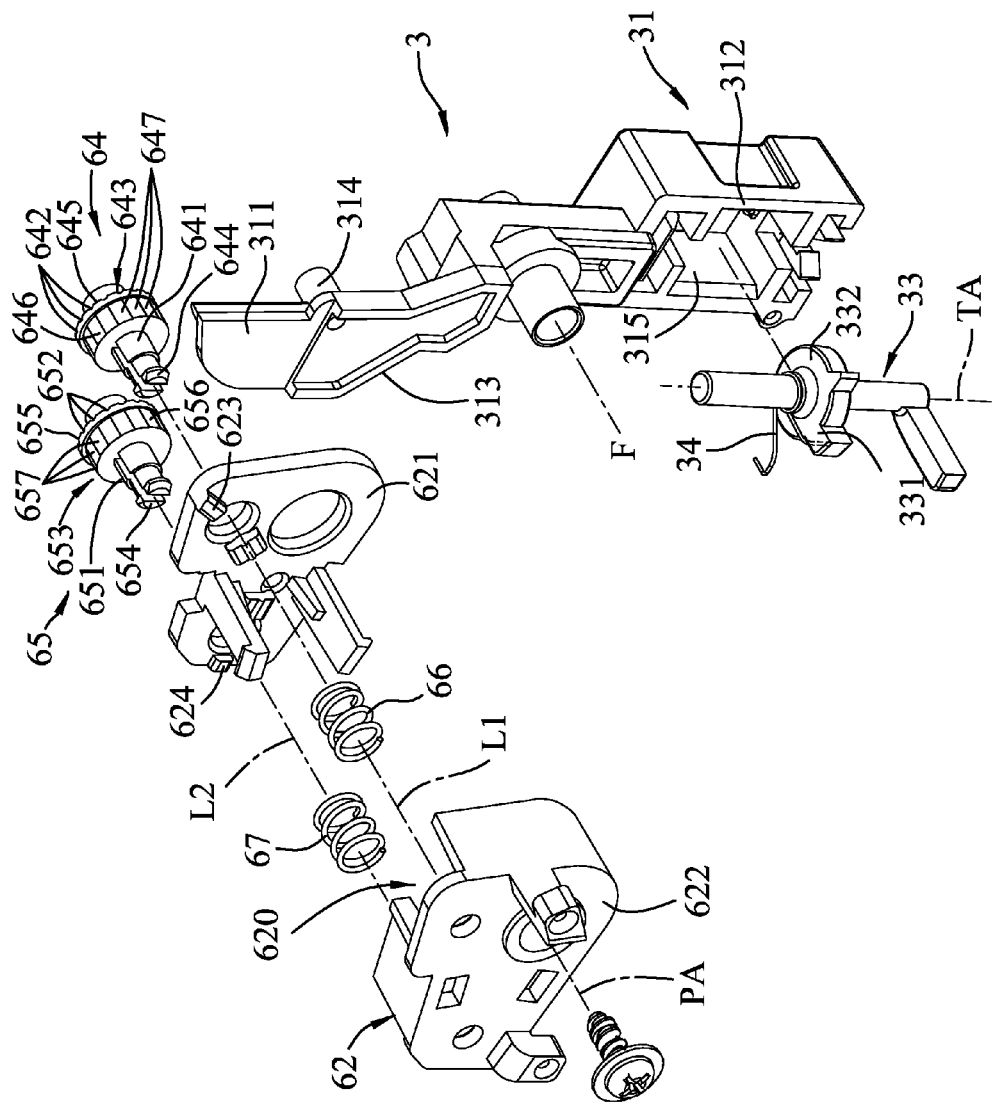
FIG. 7 is an exploded perspective view illustrating a stop unit and a lever member of the automatic record player.

In this embodiment, as best shown in FIG. 7, the lever member 31 further has a shaft 33 and a flange 332. The shaft 33 is rotatably mounted in the cavity 315 about a turning axis (TA) transverse to the fulcrum axis (F). The flange 332 extends radially from the shaft 33. The force deliver protuberance 331 is formed on the flange 332 and is angularly displaceable about the turning axis (TA) between a retreat position (FIG. 12(b)) and a pressing position (FIG. 12(a)).

Furthermore, the angular position setting unit 3 further includes a torsion spring 34, an angular lever 32, and a stop unit 62.

Figure 12:
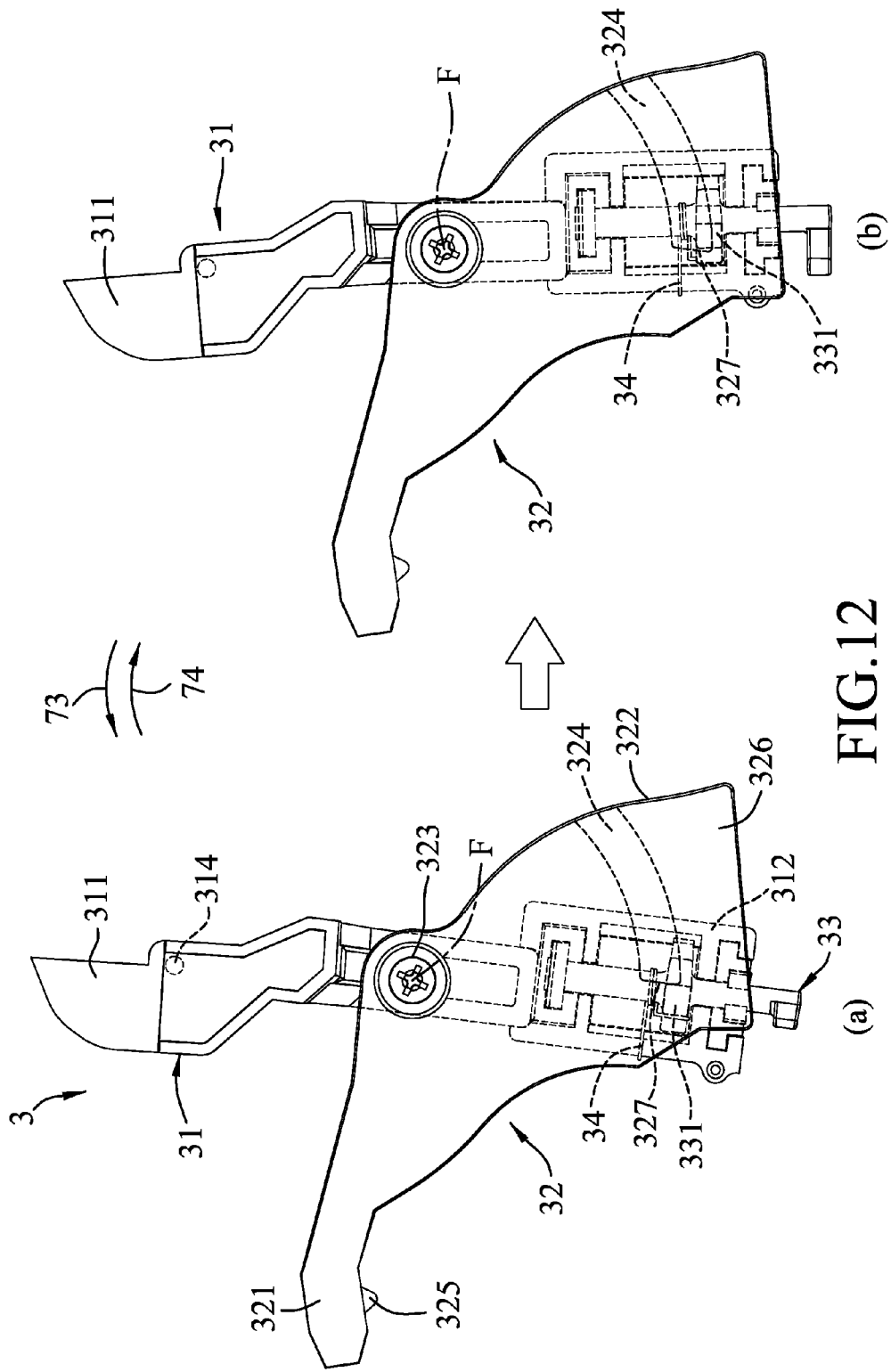
FIG. 12 illustrates movement of a force deliver protuberance when an engaging region of the angular member is in an engaged position.

The torsion spring 34 is disposed to urge the force deliver protuberance 331 to the pressing position (FIG. 12(a)) by a biasing force.

The angular lever 32 has a pivot area 323, a limited segment 321, and a force transmitting segment 326.

The pivot area 323 is rotatably mounted on the lever member 31 about the fulcrum axis (F).

Figure 11:
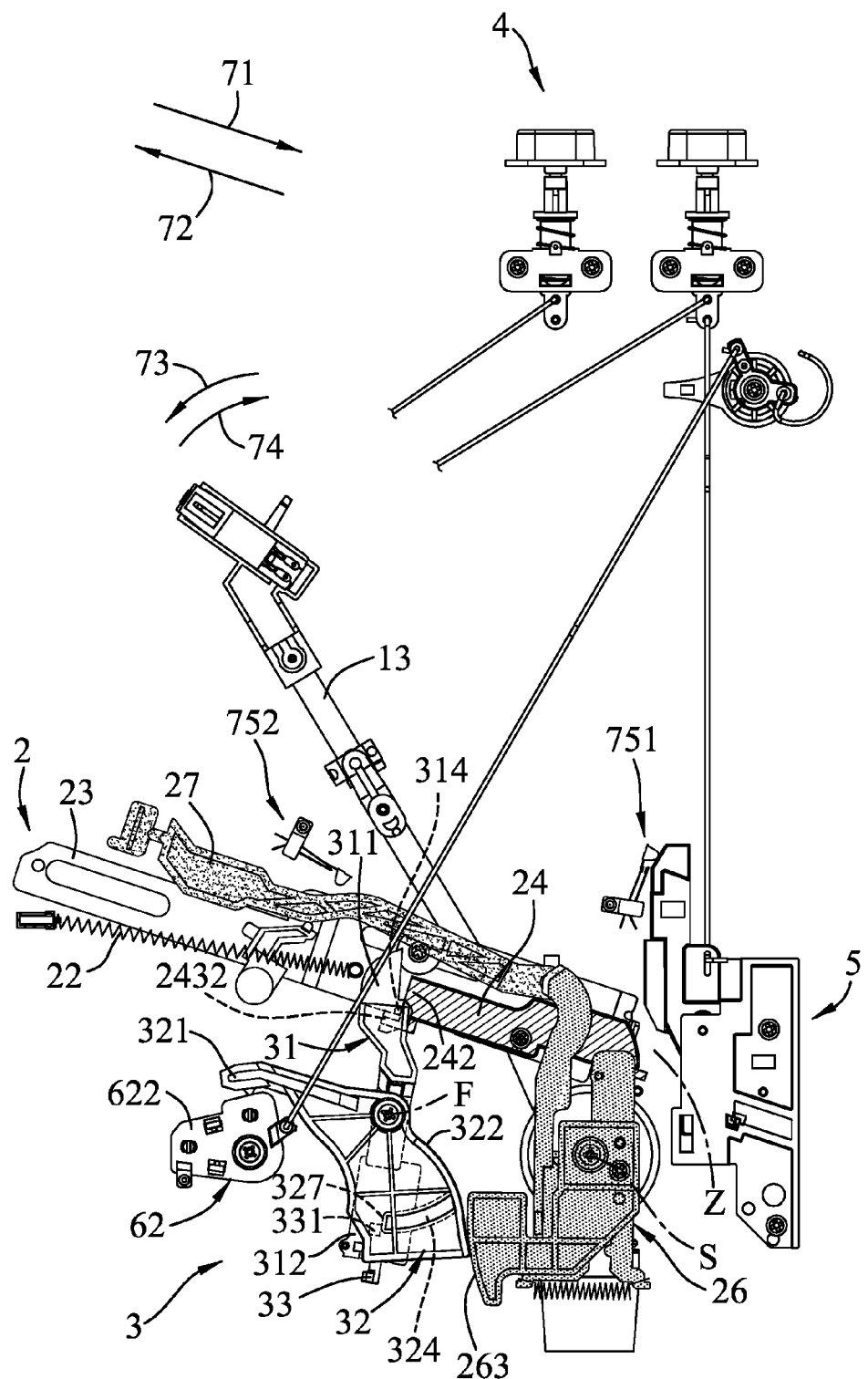
FIG. 11 is similar to FIG. 10 but illustrating the angular member to be in engagement with the stop unit.
Figure 15:
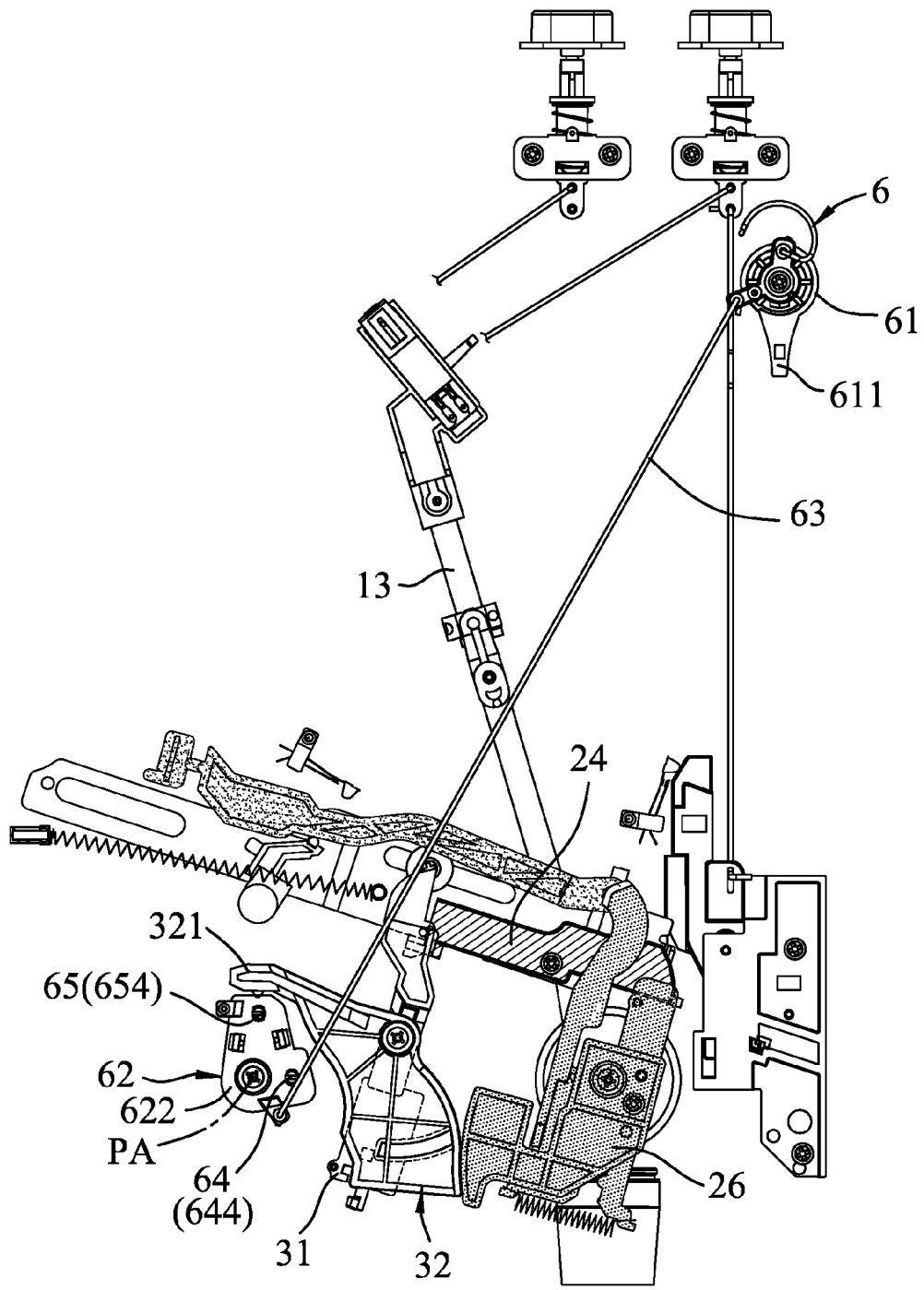
FIG. 15 is similar to FIG. 11 but illustrating the stop unit in a second stop position.
Figure 16:
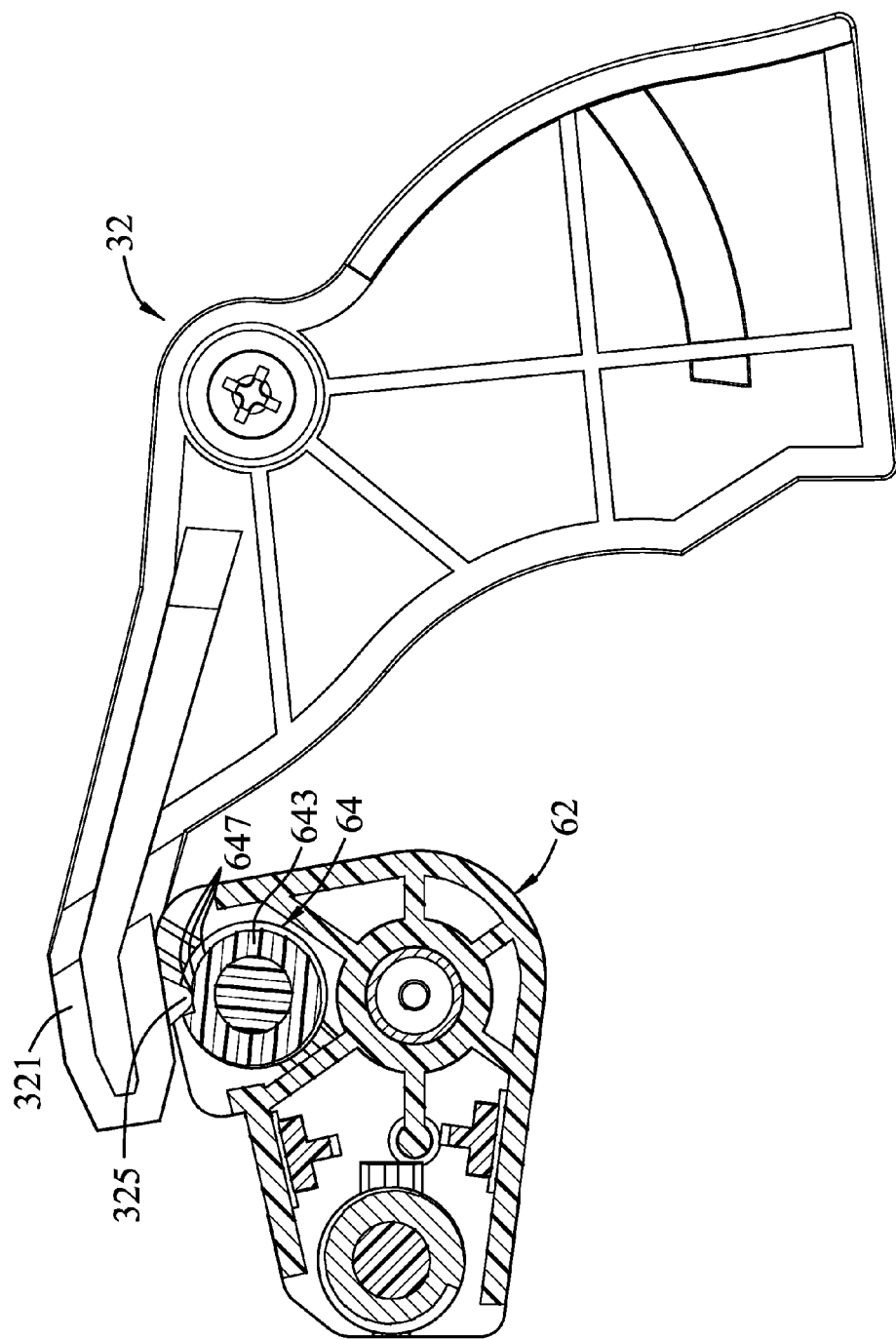
FIG. 16 is similar to FIG. 8 but illustrating the engaging region of the angular member to be in blocking engagement with a different one of first stop regions.

The limited segment 321 has an engaging region 325 which is configured such that in response to the counterclockwise angular movement of the force deliver protuberance 331, the engaging region 325 is angularly moved from a free position (FIG. 10) to an engaged position (FIGS. 11 and 15).

The force transmitting segment 326 is angularly displaced from the limited segment 321 about the fulcrum axis (F) to permit the limited segment 321 to angularly move therewith, and is configured to couple the force deliver protuberance 331 to the position guide 26 such that: (i) when the engaging region 325 is in the free position (FIG. 10), the force transmitting segment 326 is pressed by the force deliver protuberance 331 so as to transmit the counterclockwise angular movement of the force deliver protuberance 331 to the position guide 26 to thereby cause displacement of the forward free end 131 of the tonearm 13 from the outermost position (FIG. 10) to the starting position (FIG. 11), and (ii) when the engaging region 325 is blocked at the engaged position (FIG. 11), the force transmitting segment 326 is permitted to force the force deliver protuberance 331 toward the retreat position (FIG. 12(b)) against the biasing force of the torsion spring 34, so as to allow the lever member 31 to rotate about the fulcrum axis (F) relative to the angular lever 32.

As shown in FIG. 5, the force transmitting segment 326 has a coupling region 322 and a rail region 324. The coupling region 322 is configured to couple to the couple surface 263 of the position guide 26 to permit the position guide 26 to make a predetermined counterclockwise displacement based on the counterclockwise angular movement of the force deliver protuberance 331.

The rail region 324 extends from the coupling region 322 along a circumferential direction about the fulcrum axis (F) to terminate at a retaining area 327 which is configured such that (i) when the engaging region 325 is in the free position (FIG. 10), the retaining area 327 is permitted to be pressed by the force deliver protuberance 331 to transmit the counterclockwise angular movement of the force deliver protuberance 331 to the position guide 26 through the coupling region 322, and (ii) when the engaging region 325 is blocked at the engaged position (FIGS. 11 and 15), the retaining area 327 is permitted to force the force deliver protuberance 331 toward the retreat position (FIG. 12(b)) against the biasing force of the torsion spring 34 to thereby allow the force deliver protuberance 331 to slide onto the rail region 324 until the pushing region 2432 returns to the normal orientation (FIG. 13).

The stop unit 62 is disposed on the base 11 and is configured to engage the engaging region 325 in the engaged position (FIGS. 11 and 15) so as to block further movement of the engaging region 325.

In this embodiment, as shown in FIGS. 6 and 7, the stop unit 62 is pivotally mounted on the base 11 about a pivotal axis (PA), and includes a mounting wall 622, a first stop member 64 disposed on the mounting wall 622, and a second stop member 65 disposed on the mounting wall 622 to be angularly displaced from the first stop member 64 about the pivotal axis (PA).

The mounting wall 622 is configured to be driven to move between a first stop position (FIG. 11), where the first stop member 64 is disposed to engage the engaging region 325, and a second stop position (FIG. 15), where the second stop member 65 is disposed to engage the engaging region 325.

In this embodiment, as shown in FIG. 7, the stop unit 62 further includes an abutment wall 621 which, together with the mounting wall 622, defines an accommodation space 620 for receiving the first and second stop members 64, 65. The abutment wall 621 has a first retaining region 623 and a second retaining region 624 that configured to retain the first and second stop members 64, 65, respectively.

The first stop member 64 includes a first stem 641, a first wheel 643, and a first biasing member 66.

The first stem 641 is rotatably mounted on the abutment wall 621 about a first axis (L1), and extends through the mounting wall 622 to terminate a first actuated end 644. The first actuated end 644 has a slot configured to permit the first stem 641 to be driven to rotate about the first axis (L1) by a flat-blade screwdriver.

The first wheel 643 is disposed in the accommodation space 620, and is secured on the first stem 641 to rotate with the first stem 641. The first wheel 643 has a first upward surface 645 and a first rim 646.

The first upward surface 645 is disposed to confront the abutment wall 621, and has a plurality of first serrated regions 642 which are angularly displaced about the first axis (L1). Each of the first serrated regions 642 is configured to be slidably retainable by the first retaining region 623.

Figure 8:
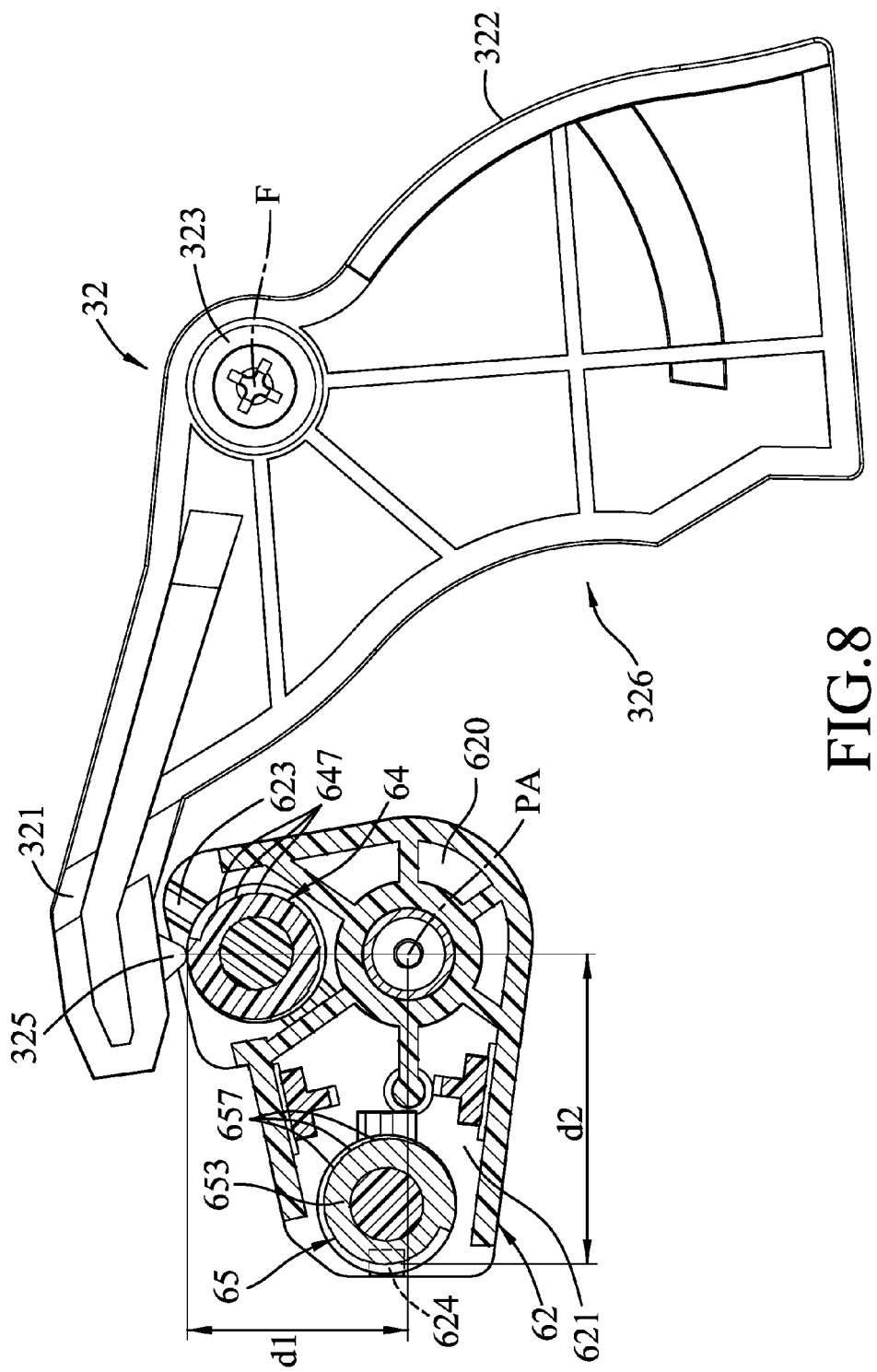
FIG. 8 is an enlarged cross-sectional view illustrating an angular member to be in engagement with the stop unit.

The first rim 646 is formed with a plurality of first stop regions 647 which are displaced from each other about the first axis (L1), and which are located at different radial distances from the first axis (L1), respectively (see FIG. 8). When the first actuated end 644 is actuated to rotate to permit a selected one of the first serrated regions 642 to be retained by the first retaining region 623, the engaging region 325 is permitted to be brought into blocking engagement with a corresponding one of the first stop regions 647.

The first biasing member 66 is disposed to bias the selected one of the first serrated regions 642 into interference engagement with the first retaining region 623.

The second stop member 65 includes a second stem 651, a second wheel 653, and a second biasing member 67.

The second stem 651 is rotatably mounted on the abutment wall 621 about a second axis (L2), and extends through the mounting wall 622 to terminate a second actuated end 654. The second actuated end 654 has a slot configured to permit the second stem 651 to be driven to rotate about the second axis (L2) by a flat-blade screwdriver.

The second wheel 653 is disposed in the accommodation space 620, and is secured on the second stem 651 to rotate with the second stem 651. The second wheel 653 has a second upward surface 655 and a second rim 656.

The second upward surface 655 is disposed to confront the abutment wall 621, and has a plurality of second serrated regions 652 which are angularly displaced about the second axis (L2). Each of the second serrated regions 652 is configured to be slidably retainable by the second retaining region 624.

The second rim 656 is formed with a plurality of second stop regions 657 which are displaced from each other about the second axis (L2), and which are located at different radial distances from the second axis (L2), respectively (FIG. 8). When the second actuated end 654 is actuated to rotate to permit a selected one of the second serrated regions 652 to be retained by the second retaining region 624, the engaging region 325 is permitted to be brought into blocking engagement with a corresponding one of the second stop regions 657.

The second biasing member 67 is disposed to bias the selected one of the second serrated regions 652 into interference engagement with the second retaining region 624.

As shown in FIG. 8, when the mounting wall 622 is in the first stop position, and when the engaging region 325 is engaged with a corresponding one of the first stop regions 647 of the first stop member 64, the engaging region 325 is spaced apart from the pivotal axis (PA) by a first distance (d1). Because the first stop regions 647 are located at different radial distances from the first axis (L1), the first distance (d1) may be slightly adjusted.

When the mounting wall 622 is in the second stop position, and when the engaging region 325 is engaged with a corresponding one of the second stop regions 657 of the second stop member 65, the engaging region 325 is spaced apart from the pivotal axis (PA) by a second distance (d2). Because the second stop regions 657 are located at different radial distances from the second axis (L2), the second distance (d2) may be slightly adjusted.

In this embodiment, the first distance (d1) is smaller than the second distance (d2).

In this embodiment, as shown in FIGS. 6 and 14, the angular position setting unit 3 further includes a non-stretchable cord 63 and a size selection member 6.

The non-stretchable cord 63 extends from the mounting wall 622 to a connection zone 60.

The size selection member 6 has a first twistable body 61 and a first finger tab 611. The first twistable body 61 is pivotally mounted on the upper surface 111 of the base 11, and is configured to secure the non-stretchable cord 63 in the connection zone 60. The first finger tab 611 extends radially from the first twistable body 61, and is configured to be angularly displaceable between a first size position and a second size position that correspond to the first and second stop positions, respectively. In FIG. 14, the first finger tab 611 drawn in solid lines is in the first size position, and the first finger tab 611 drawn in imaginary lines is in the second size position. In this embodiment, the first size position is selected for a phonograph record 10 with a smaller size, and the second size position is selected for a phonograph record 10 with a larger size.

In this embodiment, as shown in FIG. 6, the play control unit 4 further includes a second clutch actuating member 202, a stop bush button 42, and a non-stretchable cord 44.

The second clutch actuating member 202 is disposed in proximity of the wheel body 211 (see FIGS. 3 and 4) to actuate the clutch member 28 such that the clutch end 281 is displaced to the active position. The second clutch actuating member 202 is configured to be displaceable between a second actuating position (not shown), where the clutch end 281 is in the active position, and a second non-actuating position, where the clutch end 281 is in the idle position (FIG. 3) or the first clutch actuating member 201 is in the first actuating position (FIG. 4). The second clutch actuating member 202 is biased to the second non-actuating position.

To stop playing, the stop push button 42 may be depressed along the arrow direction (C) (see FIG. 13) to actuate the second clutch actuating member 202 through the non-stretchable cord 44. As soon as the second clutch actuating member 202 is moved to the second actuating position to thereby move the clutch end 281 to the active position, the second clutch actuating member 202 returns to the second non-actuating position automatically. When the clutch member 28 is actuated by the second clutch actuating member 202 to cause displacement of the distal end 235 to the remote position, (i) the pushed surface 313 is pushed by the first surface 2431 of the projection 243 to permit a clockwise angular movement of the force deliver protuberance 331 along an arrow direction 74, and (ii) the protrusion 262 is pushed by the pushing surface 232 to cause rotation of the position guide 26 to thereby displace the forward free end 131 of the tonearm 13 to the outermost position.

As shown in FIGS. 5 and 6, the elongated member 27 is coupled to the position guide 26, and has an activating region 273 which is configured such that the second microswitch 752 is kept in a switch-off state by the activating region 273 when the distal end 235 is in the close position (FIG. 6) and when the forward free end 131 of the tonearm 13 is in the outermost position (FIGS. 11 and 15), and such that when the distal end 235 is displaced from the close position or when the forward free end 131 of the tonearm 13 is displaced from the outermost position, the second microswitch 752 is set free from the activating region 273 and returns to the switch-on state.

In this embodiment, the elongated member 27 has a coupling end 271 and a clutch actuating lead end 272. The coupling end 271 is coupled to the position guide 26. The clutch actuating lead end 272 is opposite to the coupling end 271 and is configured such that once the forward free end 131 of the tonearm 13 is displaced to the innermost position, the bent tab 282 is forced by the clutch actuating leading end 272 to move the clutch end 281 of the clutch member 28 to the active position to cause displacement of the distal end 235 to the remote position so as to permit the protrusion 262 to be pushed by the pushing surface 232 to cause rotation of the position guide 26 to thereby displace the forward free end 131 of the tonearm 13 to the outermost position.

FIGS. 17 to 20 illustrate an automatic record player according to a second embodiment of the disclosure. The second embodiment is similar to the first embodiment, except that, in the second embodiment, the automatic record player further includes a replay unit 8.

Figure 19:
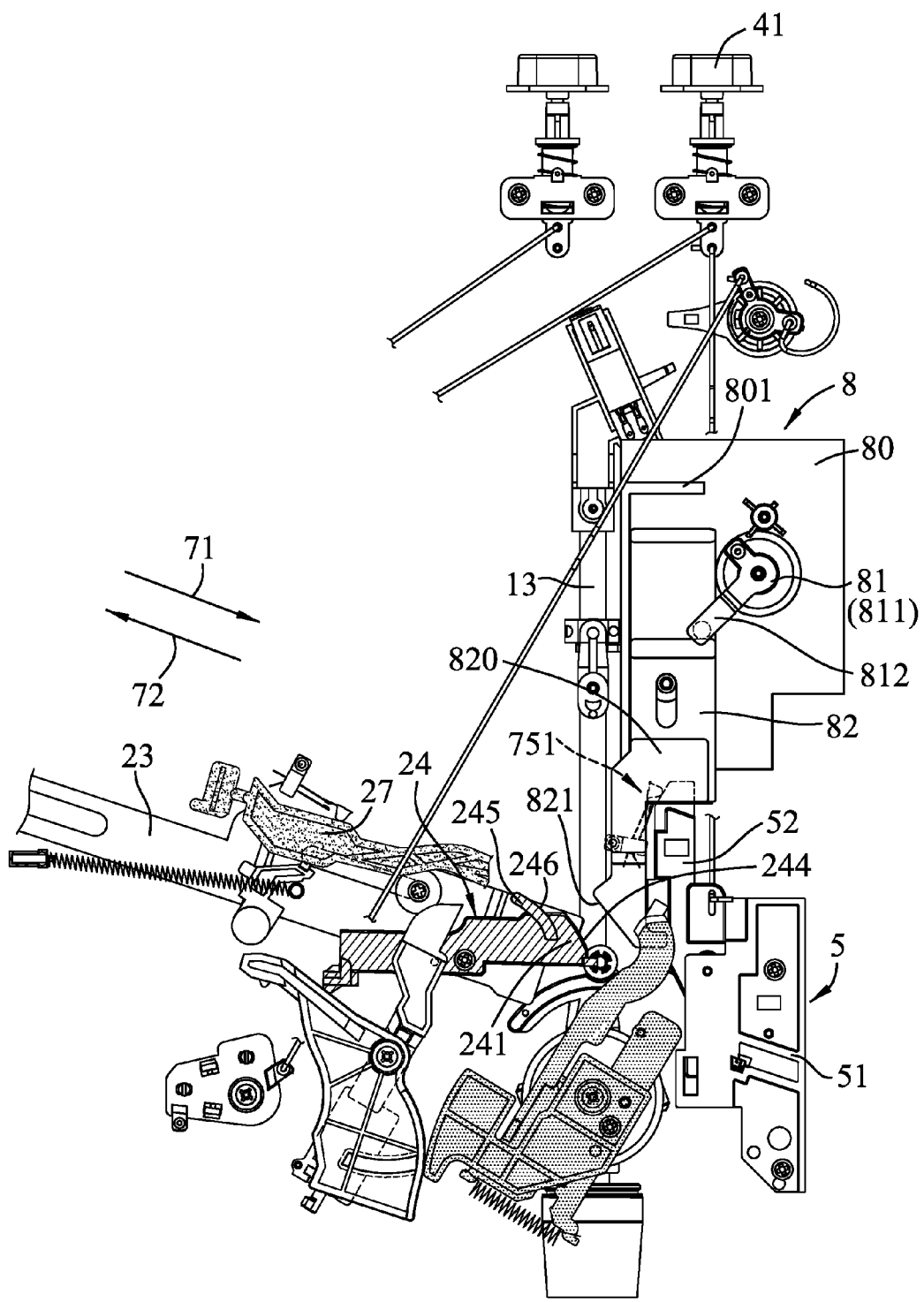
FIG. 19 is similar to FIG. 18 but illustrating a cam member in an engageable position.
Figure 20:
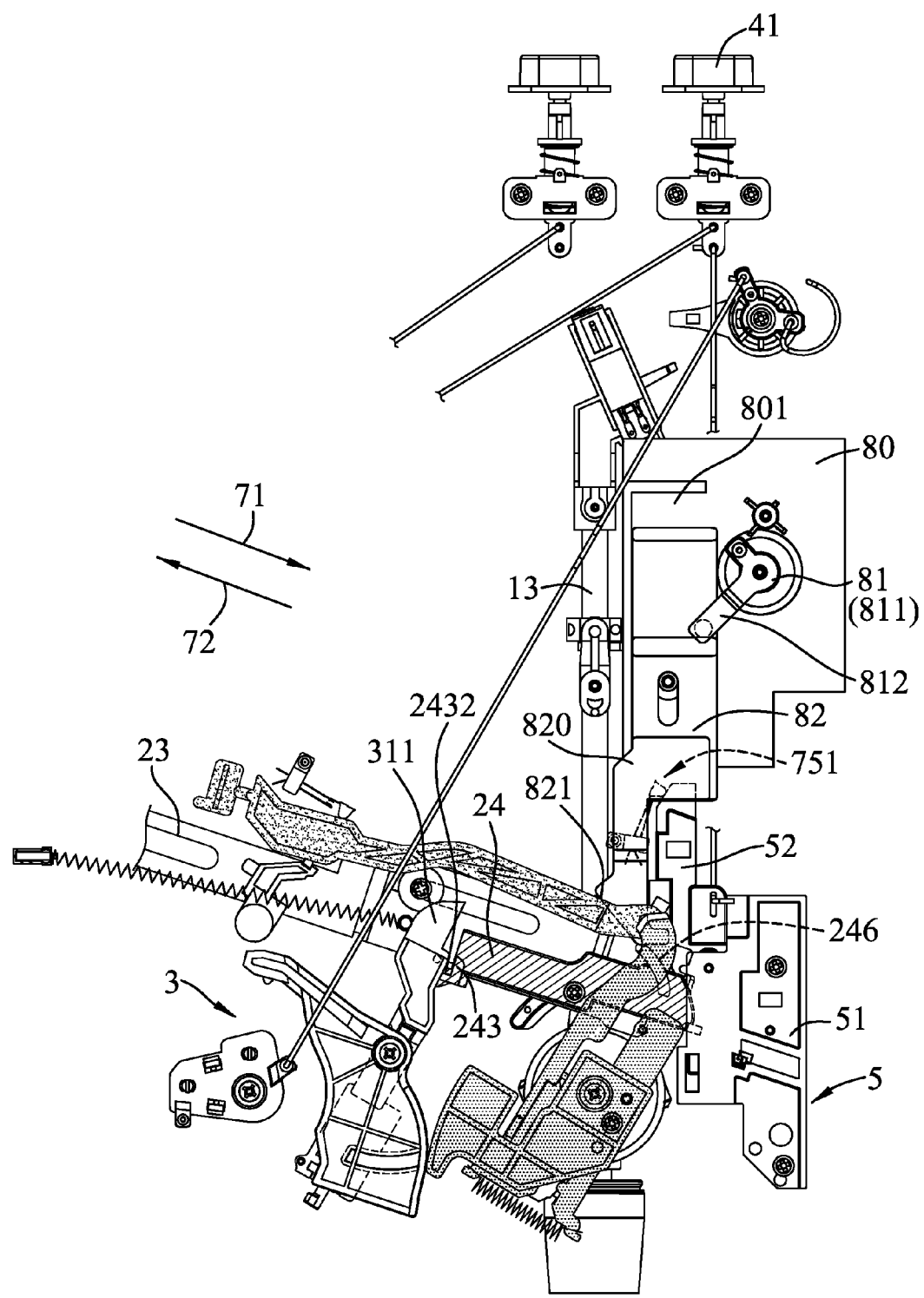
FIG. 20 is similar to FIG. 19 but illustrating a pushing region of an auxiliary arm of the automatic record player of the second embodiment in a change orientation.

As shown in FIG. 19, the first end segment 241 of the auxiliary arm 24 has a follower piece 245 with a second cam follower region 246.

The replay unit 8 includes a frame 80, a slider 82, a cam member 820, and a slider actuating member 81.

The frame 80 is disposed on the lower surface 112 of the base 11 (the lower surface 112 is only shown in FIG. 2), and defines a guideway 801.

The slider 82 is slidably mounted on the guideway 801.

The cam member 820 is coupled to move with the slider 82 between an engageable position (FIGS. 19 and 20) and a non-engageable position (FIG. 18), and has a cam surface 821 configured such that: (i) when the cam member 820 is in the engageable position (see FIGS. 19 and 20), and when the clutch member 28 is actuated by the clutch actuating lead end 272 of the elongated member 27 to cause displacement of the distal end 235 to the remote position to thereby displace the forward free end 131 of the tonearm 13 to the outermost position, the second cam follower region 246 is permitted to be brought into cam engagement with the cam surface 821 to move the pushing region 2432 to the change orientation (FIG. 20) so as to allow the forward free end 131 of the tonearm 13 to be further displaced from the outermost position to the starting position, and (ii) when the cam member 820 is in the non-engageable position (FIG. 18), the second cam follower region 246 is prevented from engaging with the cam surface 821.

The slider actuating member 81 has a pivot region 811 pivotally mounted on the frame 80, and an actuating bar 812 which extends radially from the pivot region 811, and which is configured to actuate the slider 82 to slide along the guideway 801 so as to displace the cam member 820 between the engageable position, where the slider 82 is proximate to the switch activating member 52, and the non-engageable position, where the slider 82 is distal from the switch activating member 52.

Figure 17:
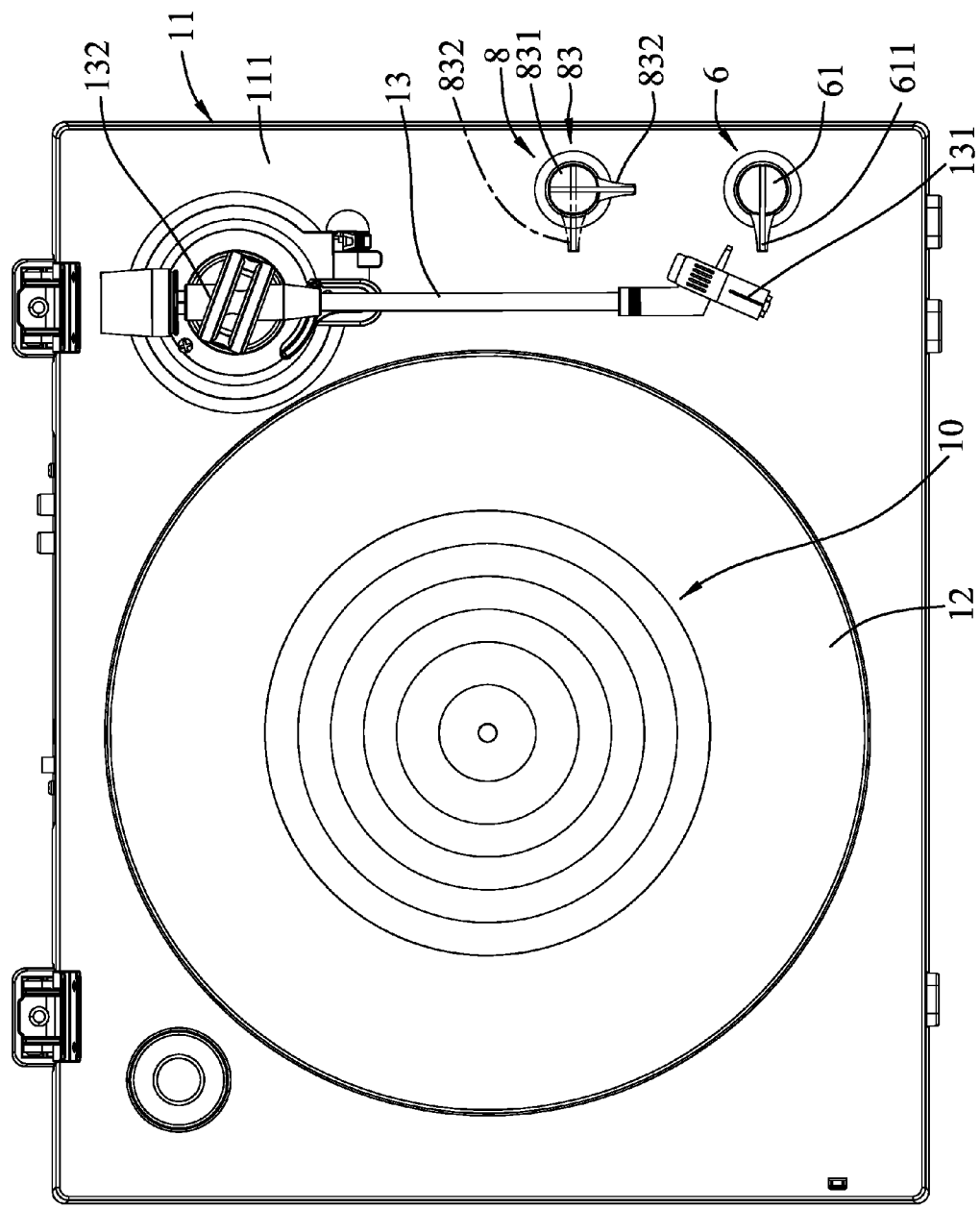
FIG. 17 is a top view of an automatic record player according to a second embodiment of the disclosure.
Figure 18:
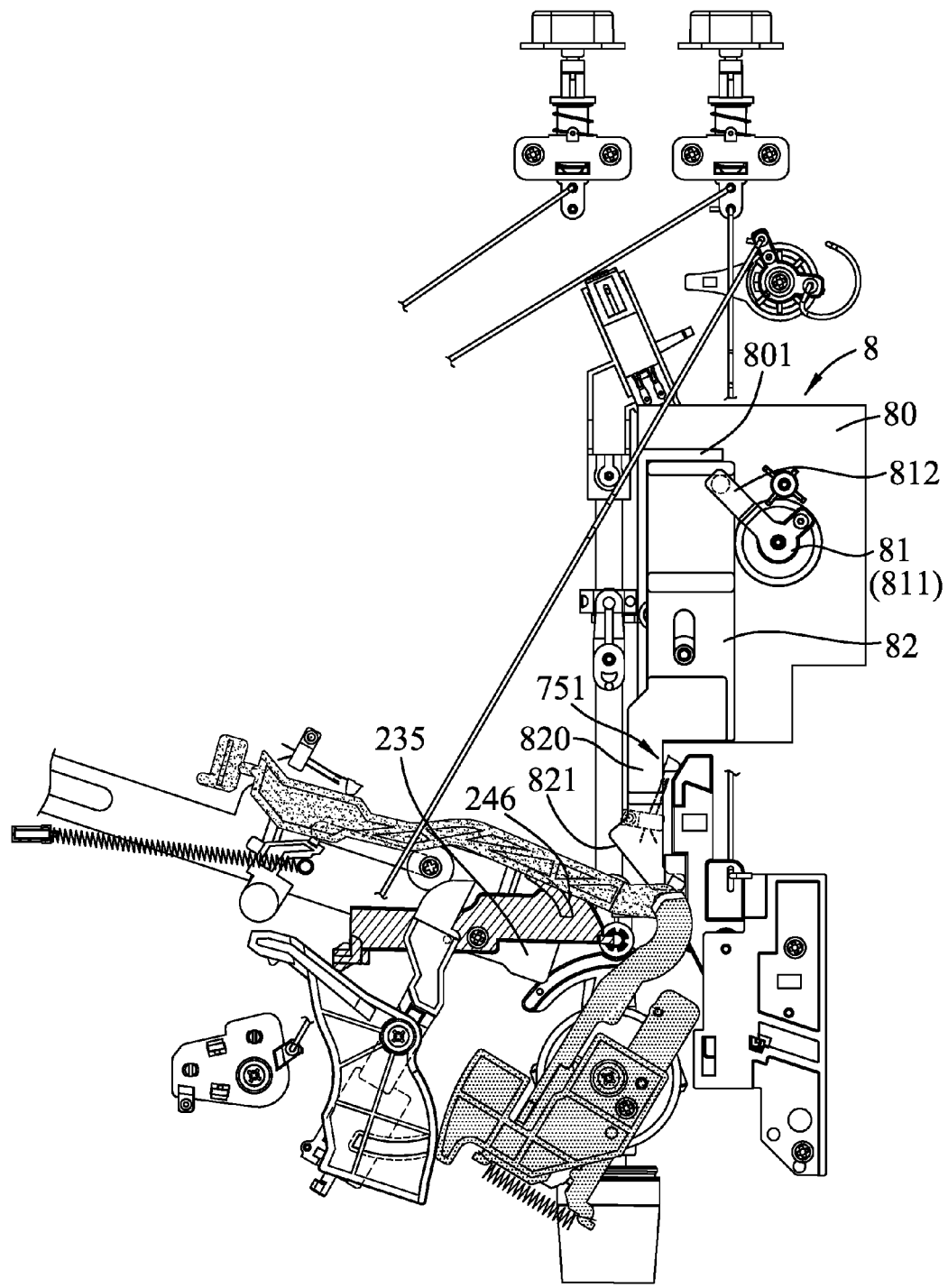
FIG. 18 is a fragmentary bottom view of the automatic record player of the second embodiment.

In this embodiment, as shown in FIG. 17, the replay unit 8 further includes a replay selection member 83 having a second twistable body 831 and a second finger tab 832.

The second twistable body 831 is pivotally mounted on the upper surface 111 of the base 11, and is configured to couple to drive the slider actuating member 81.

The second finger tab 832 extends radially from the second twistable body 831, and is configured to be angularly displaceable between a replay position and a non-replay position that correspond to the engageable position and the non-engageable position, respectively. In FIG. 17, the second finger tab 832 drawn in solid lines is in the non-replay position, and the second finger tab 832 drawn in imaginary lines is in the replay position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An automatic record player for playing a phonograph record, comprising:
    a base having an upper surface and a lower surface which are opposite to each other in an upright direction;
    a turntable rotatably mounted on said upper surface of said base about a turntable axis for supporting the phonograph record;
    an upper hub and a lower hub which are coaxially and rotatably mounted on said upper and lower surfaces of said base, respectively, and which are configured to be co-rotatable about a swivel axis parallel to the turntable axis, said upper hub being disposed outwardly of said turntable;
    a tonearm having a forward free end and a rearward end which is coupled to and rotatable with said upper hub about the swivel axis so as to permit said forward free end to be angularly displaceable among an outermost position, where said forward free end is disposed beyond a marginal edge of the phonograph record, a starting position, where said forward free end is in vertical register with an outermost groove of the phonograph record, and an innermost position, where said forward free end is in vertical register with an innermost groove of the phonograph record;
    a drive unit having an output shaft configured to drive said turntable to rotate about the turntable axis;
    a pinion having gear teeth and disposed on a lower surface of said turntable to be rotated with said turntable about the turntable axis;

a control cam having a wheel body defining a wheel axis, and a plurality of driven teeth which are disposed on a rim of said wheel body to surround the wheel axis, and which are configured to mesh with said gear teeth of said pinion so as to permit said wheel body to be driven by said pinion, said control cam further having a cutout portion configured to interrupt said driven teeth, said wheel body having an upper major surface and a lower major surface, said lower major surface having a cycle route which has an origin point and a midway point;

a main arm including an arm body having a proximate end and a distal end, and a cam follower pin which is secured to said proximate end, and which is configured to be guided by and moved along said cycle route such that when said cam follower pin is moved from said origin point to said midway point, said distal end is moved from a close position through a transit zone to a remote position, and such that when said cam follower pin is moved from said midway point back to said origin point, said distal end is moved from the remote position through said transit zone to the close position;

an auxiliary arm which is pivotally mounted on said main arm about a pivot axis, and which has
  a first end segment having a first cam follower region which is distal from said proximate end, and
  a second end segment which is opposite to said first end segment relative to the pivot axis, and which has a pushing region configured to be movable between a normal orientation and a change orientation such that said pushing region, when placed in the change orientation, is permitted to move to the normal orientation in response to movement of said distal end from the remote position through the transit zone;

a first micro-switch and a second micro-switch which are disposed distal from and proximate to said wheel body, respectively, and which are electrically connected to said drive unit such that when at least one of said first and second micro-switches is in a switch-on state, said turntable is driven by said output shaft to rotate about the turntable axis;

a clutch member pivotally mounted on said upper major surface of said wheel body, and having a clutch end which is angularly displaceable between an idle position, where said clutch end is disposed away from said cutout portion, and an active position, where said clutch end extends into said cutout portion to permit said clutch end to be engaged with said pinion so as to initiate rotation of said wheel body through meshing engagement between said driven teeth of said control cam and said gear teeth of said pinion;

a first clutch actuating member which is disposed in proximity of said wheel body to displace said clutch end to the active position, and which is configured to be displaceable between a first actuating position, where said clutch end is in the active position, and a first non-actuating position, where said clutch end is in the idle position, said first clutch actuating member being biased to the first non-actuating position;

a switch activating member which has a switch activating region and a cam region, and which is displaceable between a switch-off position and a switch-on position, said switch activating region being configured such that when said switch activating member is in the switch-off position, said first micro-switch is kept in a switch-off state by said switch activating region, and such that when said switch activating member is displaced to the switch-on position, said first micro-switch is set free from said switch activating region and returns to the switch-on state, said cam region being configured such that when said switch activating member is displaced from the switch-off position to the switch-on position to thereby permit said distal end to be moved from the close position to the remote position, said first cam follower region is brought into cam engagement with said cam region to thereby move said pushing region to the change orientation;

an actuating pin disposed on said first end segment and configured to force said switch activating member back to the switch-off position once said pushing region is moved to the change orientation;

a synchronizing unit configured to couple said switch activating member to said first clutch actuating member such that when said switch activating member is displaced to the switch-on position, said first clutch actuating member is simultaneously displaced to the first actuating position;

a position guide disposed to be rotatable with said lower hub so as to permit said tonearm to rotate with said position guide about the swivel axis;

an angular position setting unit including a lever member which is mounted pivotally on said base about a fulcrum axis parallel to and offset from the pivot axis, and which has
  a first lever segment and a second lever segment which are opposite to each other relative to the fulcrum axis,
  a force pick-up pin which is disposed on said first lever segment, and which is configured such that when said pushing region is in the change orientation, said force pick-up pin is kept in engagement with and actuated by said pushing region to angularly move about the fulcrum axis so as to advance a predetermined angular distance, and
  a force deliver protuberance which is disposed on said second lever segment, and which is actuated to make a counterclockwise angular movement and is coupled to rotate said position guide about the swivel axis based on the predetermined angular distance so as to permit said forward free end of said tonearm to be displaced from the outermost position to the starting position when said distal end is displaced from the remote position toward the close position; and an elongated member coupled to said position guide, and having an activating region which is configured such that said second micro-switch is kept in a switch-off state by said activating region when said distal end is in the close position and when said forward free end of said tonearm is in the outermost position, and such that when said distal end is displaced from the close position or when said forward free end of said tonearm is displaced from the outermost position, said second micro-switch is set free from said activating region and returns to the switch-on state.

2. The automatic record player according to claim 1, wherein:
  said second lever segment is formed with a cavity;
  said lever member further has
    a shaft which is rotatably mounted in said cavity about a turning axis transverse to the fulcrum axis, and
    a flange extending radially from said shaft;

said force deliver protuberance is formed on said flange and is angularly displaceable about the turning axis between a retreat position and a pressing position;

said angular position setting unit further includes a torsion spring disposed to urge said force deliver protuberance to the pressing position by a biasing force, an angular lever having a pivot area rotatably mounted on said lever member about the fulcrum axis, a limited segment having an engaging region which is configured such that in response to said counterclockwise angular movement of said force deliver protuberance, said engaging region is angularly moved from a free position to an engaged position, and a force transmitting segment which is angularly displaced from said limited segment about the fulcrum axis to permit said limited segment to angularly move therewith, and which is configured to couple said force deliver protuberance to said position guide such that: (i) when said engaging region is in the free position, said force transmitting segment is pressed by said force deliver protuberance so as to transmit said counterclockwise angular movement of said force deliver protuberance to said position guide to thereby cause displacement of said forward free end of said tonearm from the outermost position to the starting position, and (ii) when said engaging region is blocked at the engaged position, said force transmitting segment is permitted to force said force deliver protuberance toward the retreat position against the biasing force of said torsion spring, so as to allow said lever member to rotate about the fulcrum axis relative to said angular lever, and a stop unit disposed on said base and configured to engage said engaging region in the engaged position so as to block further movement of said engaging region.

3. The automatic record player according to claim 2, wherein said force transmitting segment has a coupling region configured to couple to said position guide to permit said position guide to make a predetermined counterclockwise displacement based on said counterclockwise angular movement of said force deliver protuberance, and a rail region extending from said coupling region along a circumferential direction about the fulcrum axis to terminate at a retaining area which is configured such that (i) when said engaging region is in the free position, said retaining area is permitted to be pressed by said force deliver protuberance to transmit said counterclockwise angular movement of said force deliver protuberance to said position guide through said coupling region, and (ii) when said engaging region is blocked at the engaged position, said retaining area is permitted to force said force deliver protuberance toward the retreat position against the biasing force of said torsion spring to thereby allow said force deliver protuberance to slide onto said rail region.

4. The automatic record player according to claim 2, wherein said stop unit is pivotally mounted on said base about a pivotal axis, and includes a mounting wall, a first stop member disposed on said mounting wall, and a second stop member disposed on said mounting wall to be angularly displaced from said first stop member about said pivotal axis, said mounting wall being configured to be driven to move between a first stop position, where said first stop member is disposed to engage said engaging region, and a second stop position, where said second stop member is disposed to engage said engaging region.

5. The automatic record player according to claim 4, wherein:

said stop unit further includes an abutment wall which, together with said mounting wall, defines an accommodation space for receiving said first and second stop members, and which has a first retaining region and a second retaining region that configured to retain said first and second stop members, respectively;

said first stop member includes a first stem rotatably mounted on said abutment wall about a first axis, and extending through said mounting wall to terminate a first actuated end, a first wheel disposed in said accommodation space, and secured on said first stem to rotate with said first stem, said first wheel having a first upward surface disposed to confront said abutment wall, and having a plurality of first serrated regions which are angularly displaced about the first axis, each of said first serrated regions being configured to be slidably retainable by said first retaining region, and a first rim formed with a plurality of first stop regions which are displaced from each other about the first axis, and which are located at different radial distances from the first axis, respectively, such that when said first actuated end is actuated to rotate to permit a selected one of said first serrated regions to be retained by said first retaining region, said engaging region is permitted to be brought into blocking engagement with a corresponding one of said first stop regions, and a first biasing member disposed to bias said selected one of said first serrated regions into interference engagement with said first retaining region; and said second stop member includes a second stem rotatably mounted on said abutment wall about a second axis, and extending through said mounting wall to terminate a second actuated end, a second wheel disposed in said accommodation space, and secured on said second stem to rotate with said second stem, said second wheel having a second upward surface disposed to confront said abutment wall, and having a plurality of second serrated regions which are angularly displaced about the second axis, each of said second serrated regions being configured to be slidably retainable by said second retaining region, and a second rim formed with a plurality of second stop regions which are displaced from each other about the second axis, and which are located at different radial distances from the second axis, respectively, such that when said second actuated end is actuated to rotate to permit a selected one of said second serrated regions to be retained by said second retaining region, said engaging region is permitted to be brought into blocking engagement with a corresponding one of said second stop regions, and a second biasing member disposed to bias said selected one of said second serrated regions into interference engagement with said second retaining region.

6. The automatic record player according to claim 4, wherein said angular position setting unit further includes
   a non-stretchable cord extending from said mounting wall to a connection zone, and
   a size selection member having
      a first twistable body pivotally mounted on said upper surface of said base, and configured to secure said non-stretchable cord in said connection zone, and
      a first finger tab extending radially from said first twistable body, and configured to be angularly displaceable between a first size position and a second size position that correspond to the first and second stop positions, respectively.

7. The automatic record player according to claim 1, further comprising a second clutch actuating member which is disposed in proximity of said wheel body to actuate said clutch member such that said clutch end is displaced to the active position, and which is configured to be displaceable between a second actuating position, where said clutch end is in the active position, and a second non-actuating position, where said clutch end is in the idle position or said first clutch actuating member is in the first actuating position, said second clutch actuating member being biased to the second non-actuating position, wherein
   said position guide has a protrusion, and said distal end of said arm body has a pushing surface configured such that when said clutch member is actuated by said second clutch actuating member to cause displacement of said distal end to the remote position, said protrusion is pushed by said pushing surface to cause rotation of said position guide to thereby displace said forward free end of said tonearm to the outermost position.

8. The automatic record player according to claim 7, wherein:
   said second end segment of said auxiliary arm is formed with a projection having a first surface and a second surface which is opposite to said first surface and which serves as said pushing region; and
   said first lever segment has a pushed surface configured such that when said clutch member is actuated by said second clutch actuating member to cause displacement of said distal end toward the remote position, said pushed surface is pushed by said first surface of said projection to permit a clockwise angular movement of said force deliver protuberance.

9. The automatic record player according to claim 1, wherein:
   said wheel body has a through bore, and said clutch member has a bent tab which extends through said through bore and downwardly of said lower major surface of said wheel body;
   said elongated member having a clutch actuating lead end configured such that once said forward free end of said tonearm is displaced to the innermost position, said bent tab is forced by said clutch actuating leading end to move said clutch end of said clutch member to the active position; and
   said position guide has a protrusion, and said distal end of said arm body has a pushing surface configured such that when said clutch member is actuated by said clutch actuating leading end to cause displacement of said distal end to the remote position, said protrusion is pushed by said pushing surface to cause rotation of said position guide to thereby displace said forward free end of said tonearm to the outermost position.

10. The automatic record player according to claim 9, wherein said first end segment of said auxiliary arm further has a second cam follower region, said automatic record player further comprising a replay unit which includes
   a frame disposed on said lower surface of said base, and defining a guideway,
   a slider slidably mounted on said guideway,
   a cam member which is coupled to move with said slider between an engageable position and a non-engageable position, and which has a cam surface configured such that:
      (i) when said cam member is in said engageable position, and when said clutch member is actuated by said clutch actuating lead end of said elongated member to cause displacement of said distal end to the remote position to thereby displace said forward free end of said tonearm to the outermost position, said second cam follower region is permitted to be brought into cam engagement with said cam surface to move said pushing region to the change orientation so as to allow said forward free end of said tonearm to be further displaced from the outermost position to the starting position, and
      (ii) when said cam member is in said non-engageable position, said second cam follower region is prevented from engaging with said cam surface, and
   a slider actuating member having a pivot region pivotally mounted on said frame, and an actuating bar which extends radially from said pivot region, and which is configured to actuate said slider to slide along said guideway so as to displace said cam member between the engageable position and the non-engageable position.

11. The automatic record player according to claim 10, wherein said replay unit further includes a replay selection member having
   a second twistable body pivotally mounted on said upper surface of said base, and configured to couple to drive said slider actuating member, and
   a second finger tab extending radially from said second twistable body, and configured to be angularly displaceable between a replay position and a non-replay position that correspond to the engageable position and the non-engageable position, respectively.

* * * * *